United States Patent
Yamamoto et al.

(10) Patent No.: US 10,411,298 B2
(45) Date of Patent: Sep. 10, 2019

(54) POLYELECTROLYTE COMPOSITION, POLYELECTROLYTE, BATTERY, AND ELECTRONIC APPARATUS

(71) Applicant: SEIKO EPSON CORPORATION, Shinjuku-ku, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 178 days.

(21) Appl. No.: 15/804,343

(22) Filed: Nov. 6, 2017

(65) Prior Publication Data
US 2018/0151915 A1 May 31, 2018

(30) Foreign Application Priority Data

Nov. 29, 2016 (JP) ................. 2016-230930

(51) Int. Cl.
*H01M 4/38* (2006.01)
*H01M 4/36* (2006.01)
(Continued)

(52) U.S. Cl.
CPC ......... *H01M 10/0565* (2013.01); *C08L 33/06* (2013.01); *H01M 10/0525* (2013.01);
(Continued)

(58) Field of Classification Search
CPC ............ H01M 4/13; H01M 4/36; H01M 4/30; H01M 10/0565; H01M 10/0568; H01M 10/052
See application file for complete search history.

(56) References Cited

U.S. PATENT DOCUMENTS

2005/0244695 A1   11/2005   Kiefer et al.
2006/0234871 A1*   10/2006   Dalrymple ............. C09K 8/428
                                                                                                         507/211

(Continued)

FOREIGN PATENT DOCUMENTS

JP    H05-217416 A    8/1993
JP    2002-316994 A    10/2002
(Continued)

*Primary Examiner* — Kenneth J Douyette
(74) *Attorney, Agent, or Firm* — Oliff PLC

(57) ABSTRACT

A polyelectrolyte composition is represented by the following formula (1).

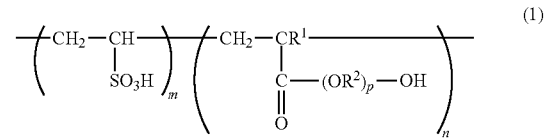

In the formula (1), $R^1$ is hydrogen or $CH_3$, $R^2$ is any of $C_2H_4$, $CH(CH_3)CH_2$, and $(CH_2)_3$, m and n are each a copolymerization ratio of a structural unit in parentheses, and when m and n are set as follows: m+n=10, m and n satisfy the following formulae: $1 \leq m \leq 5$ and $5 \leq n \leq 9$, and p is 2 or more and 8 or less.

8 Claims, 19 Drawing Sheets

(51) Int. Cl.
*H01M 10/0565* (2010.01)
*H01M 10/0525* (2010.01)
*C08L 33/06* (2006.01)
*C08F 220/28* (2006.01)

(52) U.S. Cl.
CPC ...... *C08F 220/28* (2013.01); *C08F 2220/281* (2013.01); *H01M 2220/30* (2013.01); *H01M 2300/0082* (2013.01)

(56) References Cited

U.S. PATENT DOCUMENTS

2010/0104917 A1    4/2010   Takami et al.
2012/0015246 A1*   1/2012   Amin-Sanayei ....... H01G 11/30
                                                                                        429/217

FOREIGN PATENT DOCUMENTS

JP        2005-534785 A    11/2005
JP        2008-117694 A     5/2008

\* cited by examiner

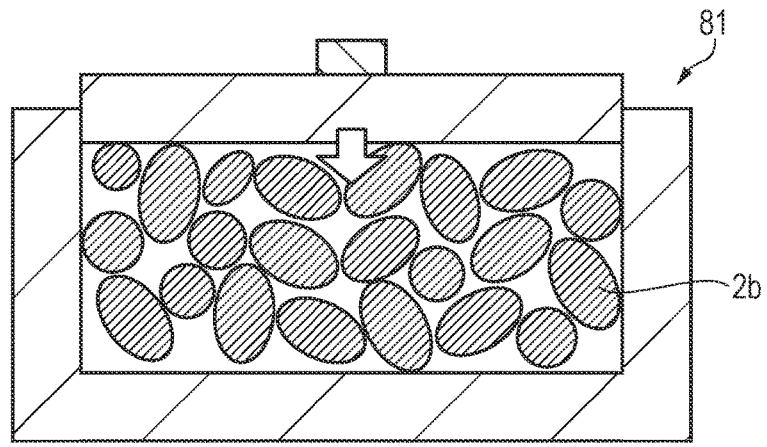
FIG. 4A
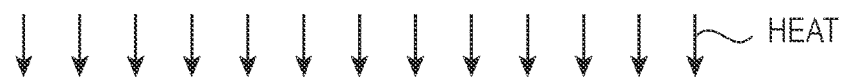
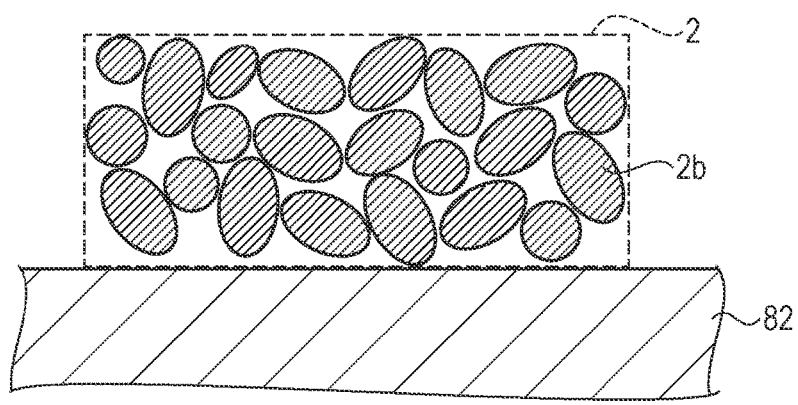
FIG. 4B

| | EXAMPLE 1 | EXAMPLE 2 | EXAMPLE 3 | EXAMPLE 4 | COMPARATIVE EXAMPLE 1 | COMPARATIVE EXAMPLE 2 |
|---|---|---|---|---|---|---|
| PPGAc (MOLECULAR WEIGHT 475.00) | 1.3870g (2.92×10$^{-3}$mol) | 1.3870g (2.92×10$^{-3}$mol) | 1.3870g (2.92×10$^{-3}$mol) | 1.3870g (2.92×10$^{-3}$mol) | 1.3870g (2.92×10$^{-3}$mol) | 1.3870g (2.92×10$^{-3}$mol) |
| VINYL SULFONIC ACID (MOLECULAR WEIGHT 108.11) | 0.3157g (2.92×10$^{-3}$mol) | 0.1351g (1.25×10$^{-3}$mol) | 0.0789g (7.30×10$^{-4}$mol) | 0.0350g (3.24×10$^{-4}$mol) | 0.0000g (0mol) | 0.3860g (3.57×10$^{-3}$mol) |
| Li-TFSI (MOLECULAR WEIGHT 287.08) | 0.4134g (1.44×10$^{-3}$mol) | 0.2957g (1.03×10$^{-3}$mol) | 0.2578g (8.98×10$^{-4}$mol) | 0.2288g (7.97×10$^{-4}$mol) | 0.2061g (7.18×10$^{-4}$mol) | 0.4593g (1.60×10$^{-3}$mol) |
| AIBN (MOLECULAR WEIGHT 164.21) | 0.0040g (2.42×10$^{-5}$mol) | 0.0028g (1.73×10$^{-5}$mol) | 0.0025g (1.51×10$^{-5}$mol) | 0.0022g (1.34×10$^{-5}$mol) | 0.0020g (1.21×10$^{-5}$mol) | 0.0044g (2.69×10$^{-5}$mol) |

FIG. 5

|  | EXAMPLE 1 | EXAMPLE 2 | EXAMPLE 3 | EXAMPLE 4 | COMPARATIVE EXAMPLE 1 |
|---|---|---|---|---|---|
| TOTAL ION CONDUCTIVITY [S/cm] | $9.5 \times 10^{-5}$ | $3.5 \times 10^{-5}$ | $1.1 \times 10^{-5}$ | $6.0 \times 10^{-6}$ | $1.1 \times 10^{-6}$ |
| EVALUATION DETERMINATION | A | A | A | B | C |

FIG. 6

|  | EXAMPLE 6 | EXAMPLE 7 | EXAMPLE 8 | EXAMPLE 9 | COMPARATIVE EXAMPLE 3 | COMPARATIVE EXAMPLE 4 |
|---|---|---|---|---|---|---|
| PPGAc (MOLECULAR WEIGHT 475.00) | 1.3870g ($2.92\times10^{-3}$mol) | 1.3870g ($2.92\times10^{-3}$mol) | 1.3870g ($2.92\times10^{-3}$mol) | 1.3870g ($2.92\times10^{-3}$mol) | 1.3870g ($2.92\times10^{-3}$mol) | 1.3870g ($2.92\times10^{-3}$mol) |
| VINYL SULFONIC ACID (MOLECULAR WEIGHT 108.11) | 0.3157g ($2.92\times10^{-3}$mol) | 0.1351g ($1.25\times10^{-3}$mol) | 0.0789g ($7.30\times10^{-4}$mol) | 0.0350g ($3.24\times10^{-4}$mol) | 0.0000g (0mol) | 0.3860g ($3.57\times10^{-3}$mol) |
| Li-TFSI (MOLECULAR WEIGHT 287.08) | 0.4134g ($1.44\times10^{-3}$mol) | 0.2957g ($1.03\times10^{-3}$mol) | 0.2578g ($8.98\times10^{-4}$mol) | 0.2288g ($7.97\times10^{-4}$mol) | 0.2061g ($7.18\times10^{-4}$mol) | 0.4593g ($1.60\times10^{-3}$mol) |
| Irgacure 651 (MOLECULAR WEIGHT 256.30) | 0.0062g ($2.42\times10^{-5}$mol) | 0.0044g ($1.73\times10^{-5}$mol) | 0.0039g ($1.51\times10^{-5}$mol) | 0.0034g ($1.34\times10^{-5}$mol) | 0.0031g ($1.21\times10^{-5}$mol) | 0.0069g ($2.69\times10^{-5}$mol) |

FIG.12

| | EXAMPLE 10 | EXAMPLE 11 | EXAMPLE 12 | EXAMPLE 13 | COMPARATIVE EXAMPLE 5 | COMPARATIVE EXAMPLE 6 |
|---|---|---|---|---|---|---|
| PEGMAc (MOLECULAR WEIGHT 360.00) | 1.0512g ($2.92 \times 10^{-3}$mol) | 1.0512g ($2.92 \times 10^{-3}$mol) | 1.0512g ($2.92 \times 10^{-3}$mol) | 1.0512g ($2.92 \times 10^{-3}$mol) | 1.0512g ($2.92 \times 10^{-3}$mol) | 1.0512g ($2.92 \times 10^{-3}$mol) |
| VINYL SULFONIC ACID (MOLECULAR WEIGHT 108.11) | 0.3157g ($2.92 \times 10^{-3}$mol) | 0.1351g ($1.25 \times 10^{-3}$mol) | 0.0789g ($7.30 \times 10^{-4}$mol) | 0.0350g ($3.24 \times 10^{-4}$mol) | 0.0000g (0mol) | 0.3860g ($3.57 \times 10^{-3}$mol) |
| Li-TFSI (MOLECULAR WEIGHT 287.08) | 0.4134g ($1.44 \times 10^{-3}$mol) | 0.2957g ($1.03 \times 10^{-3}$mol) | 0.2578g ($8.98 \times 10^{-4}$mol) | 0.2288g ($7.97 \times 10^{-4}$mol) | 0.2061g ($7.18 \times 10^{-4}$mol) | 0.4593g ($1.60 \times 10^{-3}$mol) |
| Irgacure 651 (MOLECULAR WEIGHT 256.30) | 0.0062g ($2.42 \times 10^{-5}$mol) | 0.0044g ($1.73 \times 10^{-5}$mol) | 0.0039g ($1.51 \times 10^{-5}$mol) | 0.0034g ($1.34 \times 10^{-5}$mol) | 0.0031g ($1.21 \times 10^{-5}$mol) | 0.0069g ($2.69 \times 10^{-5}$mol) |

FIG. 13

| | EXAMPLE 6 | EXAMPLE 7 | EXAMPLE 8 | EXAMPLE 9 | EXAMPLE 10 | EXAMPLE 11 | EXAMPLE 12 | EXAMPLE 13 | COM-PARATIVE EXAMPLE 3 | COM-PARATIVE EXAMPLE 5 |
|---|---|---|---|---|---|---|---|---|---|---|
| TOTAL ION CONDUCTIVITY [S/cm] | $9.5 \times 10^{-5}$ | $3.5 \times 10^{-5}$ | $1.1 \times 10^{-5}$ | $6.0 \times 10^{-6}$ | $3.1 \times 10^{-5}$ | $1.2 \times 10^{-5}$ | $3.5 \times 10^{-6}$ | $2.3 \times 10^{-6}$ | $1.1 \times 10^{-6}$ | $8.9 \times 10^{-7}$ |
| EVALUATION DETERMINATION | A | A | A | B | A | A | B | B | C | C |

FIG.15

POLYELECTROLYTE COMPOSITION, POLYELECTROLYTE, BATTERY, AND ELECTRONIC APPARATUS

BACKGROUND

1. Technical Field

The present invention relates to a polyelectrolyte composition, a polyelectrolyte, a method for producing a polyelectrolyte, a battery, a method for producing a battery, and an electronic apparatus.

2. Related Art

Heretofore, an all-solid-state battery using a solid electrolyte in place of an organic electrolytic solution as an electrolyte has been known. For example, in JP-A-2008-117694 (Patent Document 1), a solid polyelectrolyte (polyelectrolyte) which is a specific copolymer has been proposed.

However, the solid polyelectrolyte disclosed in Patent Document 1 has a problem that it is difficult to improve the ion conduction property as compared with an electrolyte using an organic electrolytic solution. Therefore, when the solid polyelectrolyte is used in a lithium battery or the like, it is difficult to ensure a lithium ion conduction property, and there is a fear that a sufficient battery capacity as a lithium battery cannot be ensured.

SUMMARY

An advantage of some aspects of the invention is to solve at least part of the problems described above and the invention can be implemented as the following forms or application examples.

Application Example

A polyelectrolyte composition according to this application example is represented by the following formula (1).

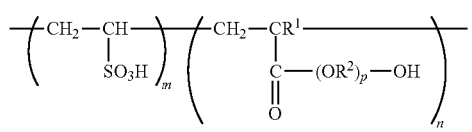

(1)

In the formula (1), $R^1$ is hydrogen or $CH_3$, $R^2$ is any of $C_2H_4$, $CH(CH_3)CH_2$, and $(CH_2)_3$, m and n are each a copolymerization ratio of a structural unit in parentheses, and when m and n are set as follows: m+n=10, m and n satisfy the following formulae: $1 \leq m \leq 5$ and $5 \leq n \leq 9$, and p is 2 or more and 8 or less.

According to this application example, by using a (vinyl sulfonate-polyalkylene glycol (meth)acrylate) copolymer which is the polyelectrolyte composition of the formula (1) as a polyelectrolyte (solid polyelectrolyte), the ion conduction property of the polyelectrolyte can be improved. Specifically, the polyelectrolyte has a sulfone group with a relatively high polarity, and therefore, ion dissociation is promoted to decrease the internal resistance, and thus, the ion conduction property is improved. Further, the polyelectrolyte has a side chain having a polyalkylene glycol structure in addition to a linear carbon main chain, and therefore, the molecular structure is not bulky as compared with, for example, an aromatic ring structure or an aliphatic ring structure, and the polyelectrolyte is rich in flexibility. Therefore, an ion transfer pathway is easily ensured, and the ion conduction property can be further improved. Therefore, by using the polyelectrolyte in a lithium battery or the like, the lithium ion conduction property is improved, and the battery capacity can be increased.

In the polyelectrolyte composition according to the application example, it is preferred that in the formula (1), when m and n are set as follows: m+n=10, m and n satisfy the following formulae: $2.5 \leq m \leq 5$ and $5 \leq n \leq 8.5$.

According to this configuration, the content ratio of the sulfone group is increased, and therefore, in the polyelectrolyte, the internal resistance is further decreased, and thus, the ion conduction property can be further improved.

Application Example

A polyelectrolyte according to this application example contains the polyelectrolyte composition according to the application example and a lithium salt compound.

According to this application example, an ion transfer pathway is ensured by the polyelectrolyte composition, and the ionic activity coefficient of the lithium salt compound is increased. That is, an ion transfer pathway corresponding to the increased ionic activity coefficient is ensured, and therefore, ionic activation is promoted, and thus, the lithium ion conduction property can be improved. According to this, a polyelectrolyte suitable for a lithium battery can be provided.

Application Example

A battery according to this application example includes an electrolyte section containing the polyelectrolyte according to the application example, an assembly provided in contact with the electrolyte section and containing an active material and an electrolyte, and a current collector provided for the electrolyte section through the assembly.

According to this application example, by the polyelectrolyte, a battery in which the ion conduction property of an electrolyte section is improved can be provided. That is, a battery capable of easily ensuring a desired battery capacity can be provided.

In the battery according to the application example, it is preferred that the electrolyte contains the polyelectrolyte according to the application example.

According to this configuration, the ion conduction property is improved not only in the electrolyte section, but also in the assembly. Therefore, the ion conduction property in the battery can be further improved. In addition, the polyelectrolyte composition has a linear carbon main chain and a side chain having a polyalkylene glycol structure, and therefore is relatively rich in flexibility. Therefore, by using the polyelectrolyte composition in the assembly and the electrolyte section, the strength against physical stress such as impact can be improved.

Application Example

A method for producing a polyelectrolyte according to this application example includes preparing a solution containing a precursor of a polyelectrolyte, which contains vinyl sulfonic acid, polyalkylene glycol (meth)acrylate, a lithium salt compound, and a polymerization initiator, and forming the polyelectrolyte by a polymerization reaction from the solution containing the precursor.

According to this application example, a polyelectrolyte containing a polyelectrolyte composition formed from vinyl sulfonic acid and polyalkylene glycol (meth)acrylate is formed. That is, a polyelectrolyte in which the lithium ion conduction property is improved can be produced.

In the method for producing a polyelectrolyte according to the application example, it is preferred that the preparing the solution containing the precursor includes preparing a first solution by mixing polyalkylene glycol (meth)acrylate and a lithium salt compound, preparing a second solution by mixing the first solution and a polymerization initiator, and preparing the solution by mixing the second solution and vinyl sulfonic acid.

According to this configuration, by mixing polyalkylene glycol (meth)acrylate and a lithium salt compound as a first solution, the solubility of the lithium salt compound can be improved. Therefore, a time required for the step of preparing a solution containing a precursor of a polyelectrolyte is reduced, and a production time for the polyelectrolyte can be reduced. Further, in the polyelectrolyte composition, uneven distribution of the lithium salt compound can be suppressed. Accordingly, the lithium ion conduction property is further improved.

In the method for producing a polyelectrolyte according to the application example, it is preferred that the polymerization initiator contains at least one of a thermal polymerization initiator and a photopolymerization initiator.

According to this configuration, by using at least one of polymerization by heat and polymerization by an energy ray, the polyelectrolyte composition can be formed.

Application Example

A method for producing a battery according to this application example includes forming a molded body having a plurality of pores using an active material, preparing a solution containing a precursor of a polyelectrolyte, which contains vinyl sulfonic acid, polyalkylene glycol (meth)acrylate, a lithium salt compound, and a polymerization initiator, bringing the solution containing the precursor into contact with the molded body, forming an assembly containing the polyelectrolyte and the molded body by polymerizing the solution containing the precursor brought into contact with the molded body to form the polyelectrolyte, and forming a current collector so as to be in contact with the assembly.

According to this application example, a battery, which contains a (vinyl sulfonate-polyalkylene glycol (meth)acrylate) copolymer as a polyelectrolyte and a lithium salt compound, and has an improved lithium ion conduction property can be produced. Further, the polyelectrolyte and the molded body of the active material form an assembly, and therefore, a contact area between the polyelectrolyte and the molded body is increased to reduce the interface impedance. Accordingly, a battery capable of achieving favorable charge transfer at the interface between the polyelectrolyte and the molded body can be produced.

Application Example

A method for producing a battery according to this application example includes forming an assembly containing an active material and an electrolyte, preparing a solution containing a precursor of a polyelectrolyte, which contains vinyl sulfonic acid, polyalkylene glycol (meth)acrylate, a lithium salt compound, and a polymerization initiator, bringing the solution containing the precursor into contact with the assembly, forming an electrolyte section containing the polyelectrolyte so as to be in contact with the assembly by polymerizing the solution containing the precursor, and forming a current collector for the electrolyte section through the assembly.

According to this application example, the electrolyte section is formed containing a (vinyl sulfonate-polyalkylene glycol (meth)acrylate) copolymer and a lithium salt compound. Accordingly, a battery in which the lithium ion conduction property of the electrolyte section is improved can be produced.

In the method for producing a battery according to the application example, it is preferred that the preparing the solution containing the precursor includes preparing a first solution by mixing polyalkylene glycol (meth)acrylate and a lithium salt compound, preparing a second solution by mixing the first solution and a polymerization initiator, and preparing the solution by mixing the second solution and vinyl sulfonic acid.

According to this configuration, in the step of preparing the solution containing the precursor, the solubility of the lithium salt compound is improved, and a production time for the battery can be reduced. Further, a battery in which uneven distribution of the lithium salt compound in the polyelectrolyte is suppressed, and the lithium ion conduction property is further improved can be produced.

Application Example

A method for producing a battery according to this application example includes preparing a mixture containing vinyl sulfonic acid, polyalkylene glycol (meth)acrylate, a lithium salt compound, a polymerization initiator, and an active material in the form of particles, forming a molded material in the form of a sheet using the mixture, forming an assembly containing the active material and a polyelectrolyte obtained by polymerizing vinyl sulfonic acid and polyalkylene glycol (meth)acrylate using the molded material, and forming a current collector so as to be in contact with the assembly.

According to this application example, a battery which contains a (vinyl sulfonate-polyalkylene glycol (meth)acrylate) copolymer as a polyelectrolyte and a lithium salt compound, and has an improved lithium ion conduction property can be produced. Further, the assembly containing the polyelectrolyte and the active material is directly formed, and therefore, the production step of the battery can be simplified.

In the method for producing a battery according to the application example, it is preferred that the preparing the mixture includes preparing a first solution by mixing polyalkylene glycol (meth)acrylate and a lithium salt compound, preparing a second solution by mixing the first solution and a polymerization initiator, preparing a solution containing a precursor of a polyelectrolyte by mixing the second solution and vinyl sulfonic acid, and preparing the mixture by mixing the solution containing the precursor and the active material in the form of particles.

According to this configuration, in the step of preparing the mixture, the solubility of the lithium salt compound is improved, and a production time for the battery can be reduced. Further, a battery in which uneven distribution of the lithium salt compound in the polyelectrolyte is suppressed, and the lithium ion conduction property is further improved can be produced.

In the method for producing a battery according to the application example, it is preferred that the mixture contains a conductive auxiliary agent.

According to this configuration, the electron conduction property can be improved by the conductive auxiliary agent.

Application Example

An electronic apparatus according to this application example includes the battery according to the application example.

According to this application example, an electronic apparatus including a battery having an improved lithium ion conduction property as a power supply source can be provided.

BRIEF DESCRIPTION OF THE DRAWINGS

The invention will be described with reference to the accompanying drawings, wherein like numbers reference like elements.

FIG. 4A is a schematic view showing the method for producing the lithium battery.

FIG. 4B is a schematic view showing the method for producing the lithium battery.

FIG. 5 is a table showing the compositions of polyelectrolytes according to Examples and Comparative Examples.

FIG. 6 is a table showing the evaluation results of the lithium ion conduction property according to Examples and Comparative Examples.

FIG. 12 is a table showing the compositions of polyelectrolytes according to Examples and Comparative Examples.

FIG. 13 is a table showing the compositions of polyelectrolytes according to Examples and Comparative Examples.

FIG. 15 is a table showing the evaluation results of the lithium ion conduction property according to Examples and Comparative Examples.

DESCRIPTION OF EXEMPLARY EMBODIMENTS

Hereinafter, embodiments of the invention will be described with reference to the drawings. Incidentally, in the following respective drawings, in order to make respective layers and respective members have a recognizable size, the respective layers and the respective members are shown at a reduced scale different from the actual one.

First Embodiment

Battery

Figure 1:
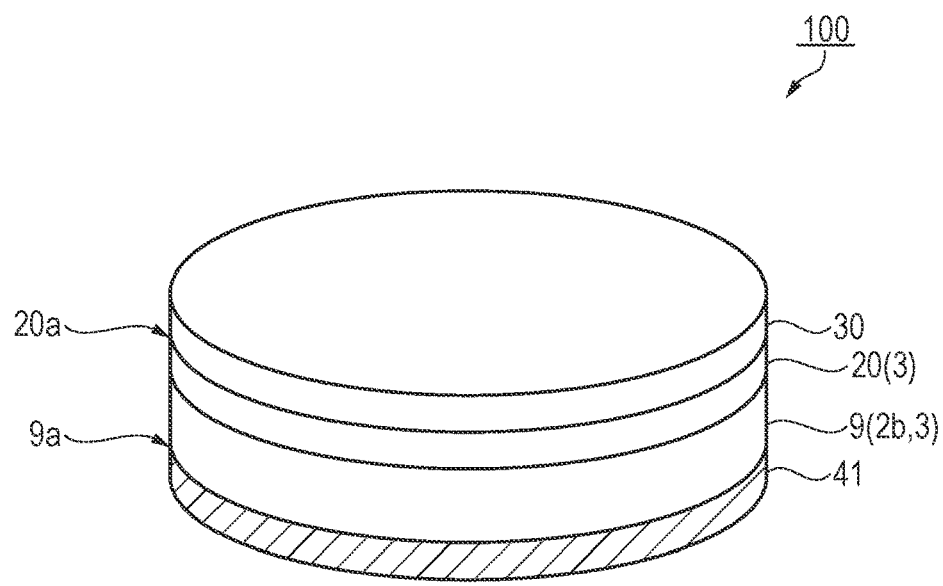
FIG. 1 is a schematic perspective view showing a configuration of a lithium battery as a battery according to a first embodiment.

First, a battery according to this embodiment will be described with reference to FIG. 1. In this embodiment, a lithium battery will be described as an example of the battery. FIG. 1 is a schematic perspective view showing a configuration of a lithium battery as the battery according to the first embodiment.

As shown in FIG. 1, a lithium battery 100 of this embodiment includes an electrolyte section 20 which contains a polyelectrolyte 3, a positive electrode 9 as an assembly which is provided in contact with the electrolyte section 20 and contains an active material 2b and the polyelectrolyte 3 as an electrolyte, and a first current collector 41 as a current collector which is provided for the electrolyte section 20 through the positive electrode 9. The first current collector 41 is provided in contact with one surface 9a of the positive electrode 9. Further, the lithium battery 100 includes a negative electrode 30 which is provided for the positive electrode 9 through the electrolyte section 20.

That is, the lithium battery 100 is a stacked body in which the first current collector 41, the positive electrode 9, the electrolyte section 20, and the negative electrode 30 are sequentially stacked. A surface which is in contact with the negative electrode 30 of the electrolyte section 20 is defined as "one surface 20a". Incidentally, for the electrolyte section 20, a second current collector (not shown) may be provided as appropriate through the negative electrode 30, and the lithium battery 100 may only have a current collector which is in contact with at least one of the positive electrode 9 and the negative electrode 30.

Current Collector

For the first current collector 41 and the second current collector, any material can be suitably used as long as it is a forming material which does not cause an electrochemical reaction with the positive electrode 9 and the negative electrode 30, and has an electron conduction property. As the forming material of the first current collector 41 and the second current collector, for example, one type of metal (metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), or an alloy containing at least one type of metal element selected from the group, a conductive metal oxide such as ITO (Tin-doped Indium Oxide), ATO (Antimony-doped Tin Oxide), or FTO (Fluorine-doped Tin Oxide), a metal nitride such as titaniumnitride (TiN), zirconiumnitride (ZrN), or tantalum nitride (TaN), or the like can be used.

As the form of the first current collector 41 and the second current collector, an appropriate form such as a metal foil, a plate, or a paste obtained by kneading a conductive fine powder with a binder, other than a thin film of the forming material having an electron conduction property, can be selected according to the intended purpose. The formation of the first current collector 41 and the second current collector may be performed after forming the positive electrode 9, the negative electrode 30, and the like, or may be performed before forming such members.

Negative Electrode

As a negative electrode active material (forming material) contained in the negative electrode 30, for example, niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), tin (Sn)-doped indium oxide (ITO), aluminum (Al)-doped zinc oxide (AZO), gallium (Ga)-doped zinc oxide (GZO), antimony (Sb)-doped tin oxide (ATO), fluorine (F)-doped tin oxide (FTO), anatase-phase $TiO_2$, a lithium composite oxide such as $Li_4Ti_5O_{12}$ or $Li_2Ti_3O_7$, a metal or an alloy such as lithium (Li), silicon (Si), tin (Sn), a silicon-manganese alloy (Si—Mn), a silicon-cobalt alloy (Si—Co), a silicon-nickel alloy (Si—Ni), indium (In), or gold (Au), a carbon material, a material obtained by intercalation of lithium ions between layers of a carbon material, or the like can be used.

The thickness of the negative electrode 30 is preferably about 50 nm to 100 µm or so, but can be arbitrarily designed according to a desired battery capacity or material properties.

The lithium battery 100 has, for example, a circular disk shape, and the size of the outer shape thereof is such that the diameter is about 10 mm and the thickness is about 150 µm. In addition to being small and thin, the lithium battery 100 can be charged and discharged, and is capable of obtaining a large output energy, and therefore can be favorably used as a power supply source (power supply) for a portable information terminal or the like. The shape of the lithium battery 100 is not limited to a circular disk shape, and may be, for example, a polygonal disk shape. Such a thin lithium battery 100 may be used alone or a plurality of lithium batteries 100 may be stacked and used. In the case of stacking the lithium batteries 100, in the lithium batteries 100, the first current collector 41 and the second current collector are not necessarily essential components, and a configuration in which one of the current collectors is included may be adopted.

Figure 2:
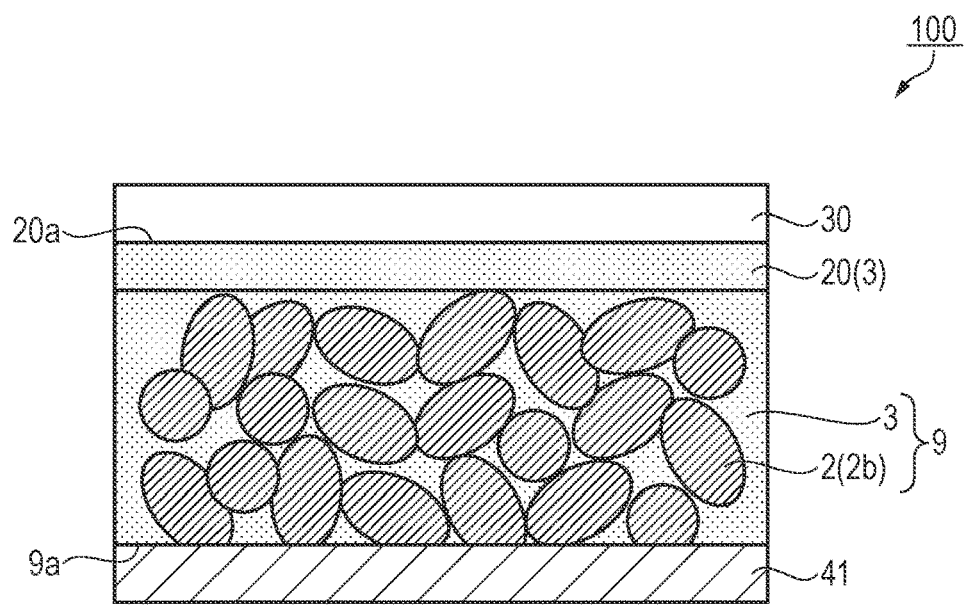
FIG. 2 is a schematic cross-sectional view showing a structure of the lithium battery.

Next, the structures of the positive electrode 9, the electrolyte section 20, and the like included in the lithium battery 100 will be described with reference to FIG. 2. FIG. 2 is a schematic cross-sectional view showing the structure of the lithium battery.

As described above, the electrolyte section 20 contains the polyelectrolyte 3, and the positive electrode 9 contains the active material 2b and the polyelectrolyte 3. The active material 2b is in the form of particles, and a plurality of particles of the active material 2b gather to form an active material section 2 having a plurality of pores.

Positive Electrode

The active material section 2 included in the positive electrode 9 is an aggregate of the active material 2b in the form of particles and has a plurality of pores. The plurality of pores communicate with one another in a mesh-like manner inside the active material section 2. Therefore, the contact between the particles of the active material 2b is ensured. The polyelectrolyte 3 is provided so as to fill the plurality of pores of the active material section 2 and further cover the entire active material section 2. That is, the active material section 2 and the polyelectrolyte 3 are assembled to form an assembly (positive electrode 9). Therefore, as compared with the case where the active material section 2 does not have a plurality of pores or the case where the polyelectrolyte 3 is not provided in the pores, the contact area between the active material 2b and the polyelectrolyte 3 becomes large. Due to this, the interface resistance is reduced, and it becomes possible to achieve favorable charge transfer at the interface between the active material section 2 and the polyelectrolyte 3.

As in the lithium battery 100 according to the embodiment, in the case where the first current collector 41 is used on the positive electrode side, as the forming material (positive electrode active material) of the active material 2b, a generally known lithium composite metal compound can be used. FIG. 2 is a view schematically showing the active material 2b, and the particle diameter or size thereof is not necessarily the same as the actual one.

The lithium composite metal compound to be used in the positive electrode active material refers to a compound such as an oxide, which contains lithium and also contains two or more types of metal elements as a whole, and in which the existence of oxoacid ion is not observed.

Examples of the lithium composite metal compound include composite metal compounds containing lithium (Li) and also containing at least one type of element selected from vanadium (V), chromium (Cr), manganese (Mn), iron (Fe), cobalt (Co), nickel (Ni), and copper (Cu). Such a composite metal compound is not particularly limited, however, specific examples thereof include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, $NMC(Li_a(Ni_xMn_yCo_{1-x-y})O_2)$, and $NCA(Li(Ni_xCo_yAl_{1-x-y})O_2)$. Further, in this embodiment, solid solutions obtained by substituting some of the atoms in a crystal of any of these lithium composite metal compounds with another transition metal, a typical metal, an alkali metal, an alkaline rare earth element, a lanthanoid, a chalcogenide, a halogen, or the like are also included in the lithium composite metal compound, and any of these solid solutions can also be used as the positive electrode active material.

By using the lithium composite metal compound as the active material 2b in the forming material of the active material section 2, electron transfer is performed between the particles of the active material 2b, and lithium ion transfer is performed between the active material 2b and the polyelectrolyte 3. According to this, the function as the active material section 2 can be favorably exhibited.

The active material section 2 has a bulk density of preferably 50% or more and 90% or less, more preferably 50% or more and 70% or less. When the active material section 2 has such a bulk density, the surface area of the inside of the pore of the active material section 2 is enlarged, and the contact area between the active material section 2 and the polyelectrolyte 3 is easily increased. According to this, in the lithium battery 100, it becomes easier to increase the capacity than in the related art.

When the above-mentioned bulk density is represented by β (%), the apparent volume including the pores of the active material section 2 is represented by v, the mass of the active material section 2 is represented by w, and the density of the particles of the active material 2b is represented by ρ, the following numerical formula (x) is established. According to this, the bulk density can be determined.

$$\beta = \{w/(v \cdot \rho)\} \times 100 \tag{x}$$

In order to control the bulk density of the active material section 2 to fall within the above range, the average particle diameter (median diameter) of the active material 2b is set to preferably 0.3 µm or more and 10 µm or less, more preferably 0.5 µm or more and 5 µm or less. The average particle diameter of the active material 2b can be measured by, for example, dispersing the active material 2b in n-octyl alcohol at a concentration of 0.1 mass % or more and 10 mass % or less, and determining the median diameter using a light scattering particle size distribution analyzer, Nanotrac UPA-EX250 (Nikkiso Co., Ltd.).

The bulk density of the active material section 2 can also be controlled by using a pore forming material in the step of forming the active material section 2.

The resistivity of the active material section 2 is preferably 700 Ω·cm or less. When the active material section 2 has such a resistivity, in the lithium battery 100, a sufficient output can be obtained. The resistivity can be determined by adhering a copper foil as an electrode to the surface of the active material section 2, and measuring a direct current polarization.

In the active material section 2, the plurality of pores communicate with one another in a mesh-like manner, and therefore, also in the solid portion of the active material section 2, a mesh-like structure is formed. For example, LiCoO₂, which is a positive electrode active material, is known to have anisotropy in the electron conduction property in a crystal. Due to this, in a structure in which pores extend in a specific direction such that the pores are formed by machining, the electron conduction property may be decreased depending on the direction of the electron conduction property in a crystal. On the other hand, in this embodiment, the active material section 2 has a mesh-like structure, and therefore, a continuous surface which is electrochemically active regardless of the anisotropy in the electron conduction property or ion conduction property in a crystal. Due to this, favorable electron conduction can be ensured regardless of the type of the forming material to be used.

In the active material section 2, the contained amount of the binder (binding agent) for binding the particles of the active material 2b or the pore forming material for adjusting the bulk density of the active material section 2 is preferably reduced as much as possible. When the binder or the pore forming material remains in the active material section 2 (positive electrode 9), such a component may sometimes adversely affect the electrical characteristics, and therefore, it is necessary to remove the component by carefully performing heating in a post-process. Specifically, in this embodiment, the percentage loss in mass in the case where the positive electrode 9 is heated at 400° C. for 30 minutes is set to 5 mass % or less. The percentage loss in mass is preferably 3 mass % or less, more preferably 1 mass % or less, and further more preferably, the mass loss is not observed or is within the limits of measurement error. When the percentage loss in mass of the positive electrode 9 is within such a range, the amount of a solvent or adsorbed water which is evaporated, an organic material which is vaporized by burning or oxidation under a predetermined heating condition, or the like is reduced. Accordingly, the electrical characteristics (charge/discharge characteristics) of the lithium battery 100 can be further improved.

The polyelectrolyte 3 contains a polyelectrolyte composition represented by the following formula (1) and a lithium salt compound.

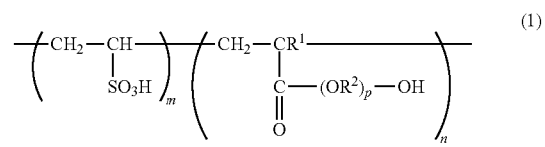

In the formula (1), R¹ is hydrogen or CH₃, R² is any of C₂H₄, CH(CH₃)CH₂, and (CH₂)₃, m and n are each a copolymerization ratio of a structural unit in parentheses, and when m and n are set as follows: m+n=10, m and n satisfy the following formulae: 1≤m≤5 and 5≤n≤9, and p is 2 or more and 8 or less.

The polyelectrolyte composition represented by the above formula (1) is a (vinyl sulfonate-polyalkylene glycol (meth)acrylate) copolymer obtained using vinyl sulfonic acid and polyalkylene glycol (meth)acrylate as forming materials. In this specification, acrylate and methacrylate are collectively referred to as "(meth)acrylate", and the same applies also to similar compounds having a (meth)acrylate structure.

As shown in the above formula (1), m and n are each a copolymerization ratio (copolymerization molar ratio) of a structural unit in parentheses, and m shows the copolymerization ratio of a structural unit derived from vinyl sulfonic acid, and n shows the copolymerization ratio of a structural unit derived from polyalkylene glycol (meth)acrylate. When m and n are set as follows: m+n=10, m and n satisfy the following formulae: 1≤m≤5 and 5≤n≤9, preferably 2.5≤m≤5 and 5≤n≤8.5. By setting the copolymerization molar ratio within the above range, the internal resistance of the polyelectrolyte 3 is decreased, and the ion conduction property can be improved. Further, the solubility of the lithium salt compound in the polyelectrolyte composition can be improved.

As described in the explanatory note to the above formula (1), p represents the number of repetitions (number of moles) of an alkylene glycol structure in the polyalkylene glycol (meth)acrylate, and is 2 or more and 8 or less, preferably 2 or more and 6 or less. By setting the number of moles of the polyalkylene glycol structure within the above range, the glass transition temperature of the polyelectrolyte composition is adjusted, and the flexibility can be improved.

The polyalkylene glycol (meth)acrylate is not particularly limited as long as the above formula (1) is satisfied, however, it is more preferred to use one or more types selected from the group consisting of polyethylene glycol acrylate, polypropylene glycol acrylate, polytrimethylene glycol acrylate, polyethylene glycol methacrylate, polypropylene glycol methacrylate, and polytrimethylene glycol methacrylate. By using such a polyalkylene glycol (meth)acrylate, the flexibility of the polyelectrolyte composition can be further improved.

The lithium salt compound is not particularly limited, but examples thereof include lithium bis(trifluoromethanesulfonyl)imide (Li-TFSI), lithium bis(fluorosulfonyl)imide (Li—FSI), lithium hexafluorophosphate (LiPF₆), lithium perchlorate (LiClO₄), lithium tetrafluoroborate (LiBF₄), and lithium hexafluoroarsenate (LiAsF₆). It is possible to use one or more types selected from the above group. By using such a lithium salt compound, the ionic activity coefficient in the polyelectrolyte can be further increased.

As the electrolyte of the positive electrode 9, it is preferred to use the above-mentioned polyelectrolyte 3, however, it is also possible to use any other solid electrolyte. Examples of such other solid electrolytes include crystalline materials or amorphous materials containing an oxide, a sulfide, a halide, a nitride, a hydride, a boride, or the like.

Examples of the solid electrolyte which is an oxide crystalline material include $Li_{0.35}La_{0.55}TiO_3$, $Li_{0.2}La_{0.27}NbO_3$, perovskite crystals or perovskite-like crystals in which some of the elements of such a crystal are substituted with nitrogen (N), fluorine (F), aluminum (Al), strontium (Sr), scandium (Sc), tantalum (Ta), a lanthanoid element, or the like, $Li_7La_3Zr_2O_{12}$, $Li_5La_3Nb_2O_{12}$, $Li_5BaLa_2TaO_{12}$, garnet crystals or garnet-like crystal in which some of the elements of such a crystal are substituted with nitrogen (N), fluorine (F), aluminum (Al), strontium (Sr), scandium (Sc), tantalum (Ta), a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, NASICON crystals in which some of the elements of such a crystal are substituted with nitrogen (N), fluorine (F), aluminum (Al), strontium (Sr), scandium (Sc), tantalum (Ta), a lanthanoid element, or the like, LISICON crystals such as $Li_{14}ZnGe_4O_{16}$, $Li_{3.4}V_{0.6}Si_{0.4}O_4$, $Li_{3.6}V_{0.4}Ge_{0.6}O_4$, and $Li_{2+x}C_{1-x}B_xO_3$.

Examples of the solid electrolyte which is a sulfide crystalline material include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of the solid electrolyte which is an amorphous material include $Li_2$—$TiO_2$, $La_2O_3$—$Li_2O$—$TiO_2$, $LiNbO_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$, $Li_4SiO_4$—$Li_4ZrO_4$, $SiO_2$—$P_2O_5$—$Li_2O$, $SiO_2$—$P_2O_5$—$LiCl$, $Li_2O$—$LiCl$—$B_2O_3$, LiI, LiI—$CaI_2$, LiI—CaO, $LiAlCl_4$, $LiAlF_4$, LiF—$Al_2O_3$, LiBr—$Al_2O_3$, $Li_{2.88}PO_{3.73}N_{0.14}$, $Li_3NI_2$, $Li_3N$—LiI—LiOH, $Li_3N$—LiCl, $Li_6NBr_3$, $Li_2S$—$SiS_2$—LiI, and $Li_2S$—$SiS_2$—$P_2S_5$.

Further, among the above-mentioned other solid electrolytes, it is preferred to use a lithium composite metal compound of the following formula (2) or (3). By using such a lithium composite metal compound as the other solid electrolytes, the lithium ion conduction property in the positive electrode 9 can be improved.

$$(Li_{7-3x+y}Ga_x)(La_{3-y}Ca_y)Zr_2O_{12} \quad (2)$$

In the formula (2), x and y satisfy the following formulae: $0.1 \le x \le 1$ and $0.01 \le y \le 0.5$.

$$Li_{7-z}La_3(Zr_{2-z}A_\alpha)O_{12} \quad (3)$$

In the formula (3), z satisfies the following formula: $0.1 \le z \le 1$, A represents at least one type of tantalum (Ta), niobium (Nb), and antimony (Sb), and a satisfies the following formula: $0 \le \alpha < 2$.

Electrolyte Section

The electrolyte section 20 is provided between the positive electrode 9 and the negative electrode 30 as described above. The electrolyte section 20 contains the polyelectrolyte 3, but does not contain the active material 2b. In the electrolyte section 20, the same polyelectrolyte 3 as in the positive electrode 9 described above can be used. By interposing the electrolyte section 20 which does not contain the active material 2b between the positive electrode 9 and the negative electrode 30, it becomes difficult to electrically connect the positive electrode 9 to the negative electrode 30, and the occurrence of a short circuit is suppressed.

The thickness of the electrolyte section 20 is preferably 0.1 μm or more and 100 μm or less, more preferably 0.2 μm or more and 10 μm or less. By setting the thickness of the electrolyte section 20 within the above range, the internal resistance of the electrolyte section 20 is decreased, and the occurrence of a short circuit between the positive electrode 9 and the negative electrode 30 can be suppressed.

On the one surface 20a (the surface in contact with the negative electrode 30) of the electrolyte section 20, a relief structure such as a trench, a grating, or a pillar may be provided by combining various molding methods and processing methods as needed.

As an index of the ion conduction property of the polyelectrolyte 3 and the other solid electrolytes, an ion conductivity can be adopted. The ion conductivity refers to a bulk conductivity as the conductivity of the electrolyte (solid electrolyte) thereof, a grain boundary conductivity as the conductivity between crystal grains in the case where the solid electrolyte is a crystalline material, and a total ion conductivity which is the sum of these conductivities. The polyelectrolyte 3 is not a crystalline material, and therefore, the total ion conductivity is equal to the bulk conductivity.

The total ion conductivity of the solid electrolyte is preferably $2.0 \times 10^{-6}$ S/cm or more. When the solid electrolyte has such a total ion conductivity, an ion contained in the solid electrolyte at a position away from the surface of the active material section 2 easily reaches the surface of the active material section 2. Due to this, also the ion can contribute to the battery reaction in the active material section 2, and the capacity of the lithium battery 100 can be further increased. The measurement method for the total ion conductivity will be described later.

Method for Producing Battery

Figure 3:
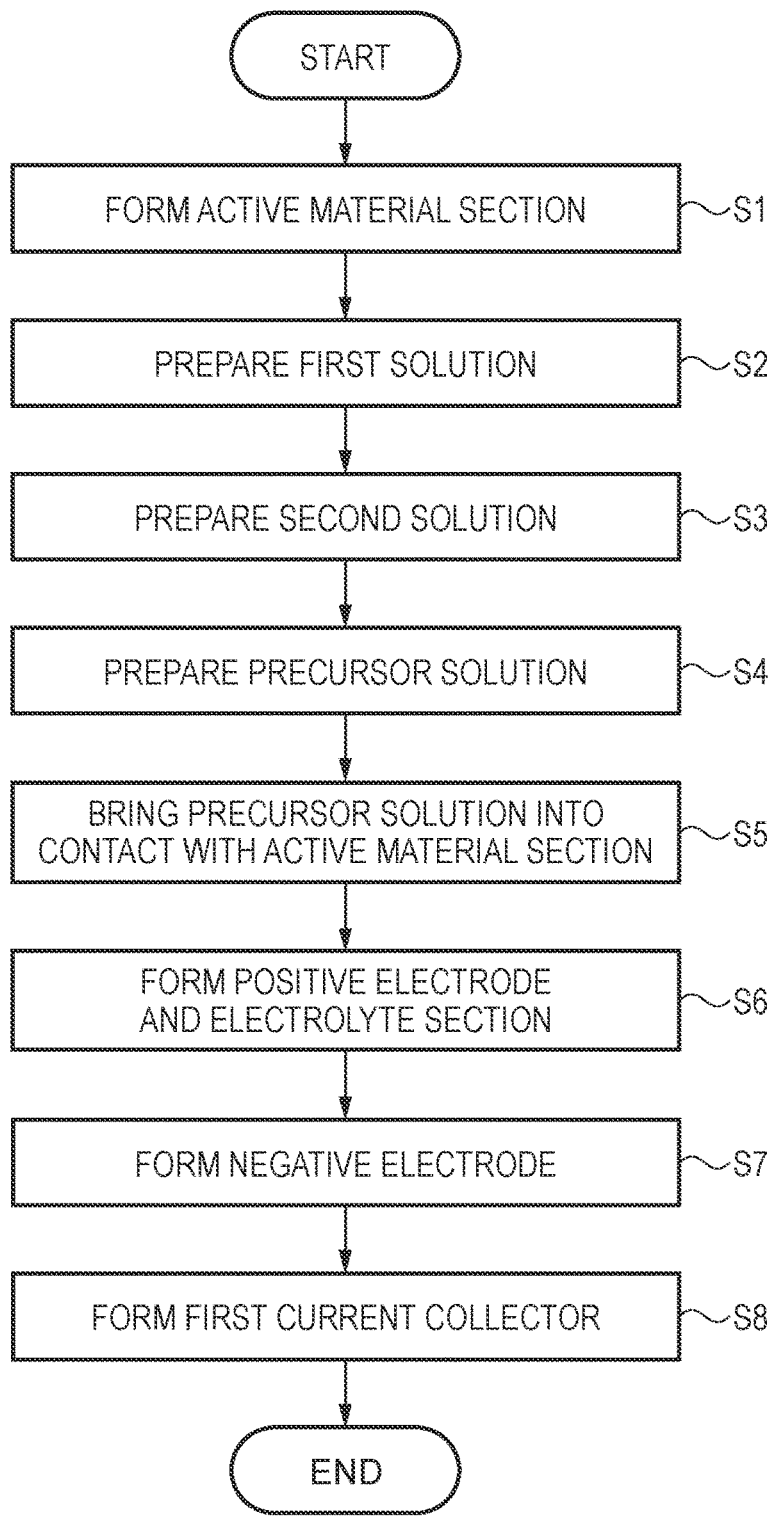
FIG. 3 is a process flowchart showing a method for producing the lithium battery.

A method for producing the lithium battery 100 according to this embodiment will be described with reference to FIGS. 3, 4A, 4B, 4C, 4D, 4E, 4F, and 4G. FIG. 3 is a process flowchart showing a method for producing the lithium battery. FIGS. 4A to 4G are schematic views showing the method for producing the lithium battery. The process flowchart shown in FIG. 3 is an example, and the method is not limited thereto.

As shown in FIG. 3, the method for producing the lithium battery 100 includes a step S1 of forming an active material section 2 as a molded body having a plurality of pores using an active material 2b, a step S2 of preparing a first solution 1X by mixing polyalkylene glycol (meth)acrylate and a lithium salt compound, a step S3 of preparing a second solution 2X by mixing the first solution 1X and a polymerization initiator, a step S4 of preparing a solution 3X containing a precursor of a polyelectrolyte 3 (hereinafter also simply referred to as "precursor solution 3X") by mixing the second solution 2X and vinyl sulfonic acid, a step S5 of bringing the precursor solution 3X of the polyelectrolyte 3 into contact with the active material section 2, a step S6 of forming a positive electrode 9 which contains the polyelectrolyte 3 and the active material section 2 and an electrolyte section 20 which is in contact with the positive electrode 9 by polymerizing the precursor solution 3X of the polyelectrolyte 3 which is in contact with the active material section 2 to form the polyelectrolyte 3, a step S7 of forming a negative electrode 30 so as to be in contact with the electrolyte section 20, and a step S8 of forming a first current collector 41 so as to be in contact with the positive electrode 9.

In the step S1, the active material section 2 is formed using the active material 2b. In this embodiment, as the forming material of the active material 2b, $LiCoO_2$ which is the lithium composite metal compound described above is used. First, the particles of LiCoO$_2$ (Sigma-Aldrich Co., Ltd.) is subjected to a classification operation in n-butanol using a wet-type centrifuge model LC-1000 (Krettek Separation GmbH), whereby the active material 2b having an average particle diameter of about 5 µm is obtained. The melting point of the active material 2b was measured using Simultaneous Thermal Analyzer TG-DTA/DSC STA8000 (PerkinElmer Co., Ltd.), and found to be about 950° C.

Subsequently, the active material 2b is compression-molded using a molding die 81 (a die with an exhaust port having an inner diameter of 10 mm). Specifically, as shown in FIG. 4A, a powder of the active material 2b is filled in the molding die 81 and pressed at a pressure of 624 MPa for 2 minutes. By doing this, a disk-shaped molded material (diameter: 10 mm, thickness: 150 µm) is obtained from LiCoO$_2$ (active material 2b).

Subsequently, the disk-shaped molded material is fired, whereby the active material section 2 is formed. As shown in FIG. 4B, the disk-shaped molded material of the active material 2b is placed on a substrate 82 made of magnesium oxide, and subjected to a heating treatment at 900° C. for 8 hours, whereby the active material section 2 is obtained. The heating treatment temperature is preferably, for example, 850° C. or higher and lower than the melting point of the active material 2b. By this heating treatment, the particles of the active material 2b are sintered to one another, and the shape of the disk-shaped molded material is easily retained. Further, the particles of the active material 2b are brought into contact with each other and bound to each other, whereby an electron transfer pathway is formed.

According to this, the particles of the active material 2b are sintered to one another, whereby an integrated active material section 2 is obtained. By setting the heating treatment temperature to 850° C. or higher, sintering proceeds sufficiently, and also the electron conduction property in the crystal of the active material 2b is ensured. By setting the heating treatment temperature lower than the melting point of the active material 2b, excessive volatilization of lithium ions in the crystal of the active material 2b is suppressed, and the lithium ion conduction property is maintained. Due to this, it becomes possible to ensure the electrical capacity of the positive electrode 9. The heating treatment temperature is more preferably 875° C. or higher and 950° C. or lower. According to this, in the lithium battery 100, an appropriate output and capacity can be provided.

The heating treatment time is preferably set to, for example, 5 minutes or more and 36 hours or less, more preferably 4 hours or more and 14 hours or less. By the above-mentioned treatment, the active material section 2 having a plurality of pores is obtained. The forming material of the substrate 82 is not particularly limited, however, it is preferred to use a material which is less likely to react with the active material 2b, the polyelectrolyte 3, or the like. As the forming material of the substrate 82, other than magnesium oxide, for example, a single crystal substrate of aluminum oxide, zinc oxide, or silicon carbide can be used.

In the step S2 to the step S4, the precursor solution 3X of the polyelectrolyte 3 is prepared. First, in the step S2, polyalkylene glycol (meth)acrylate and a lithium salt compound are mixed, whereby the first solution 1X is prepared. As the polyalkylene glycol (meth)acrylate and the lithium salt compound, those described above can be used. In this embodiment, as the polyalkylene glycol (meth)acrylate, polypropylene glycol acrylate (polypropylene glycol monoacrylate) (number average molecular weight Mn: 475, Aldrich Co., Ltd.) is used, and as the lithium salt compound, Li-TFSI is used.

Figure 4C:
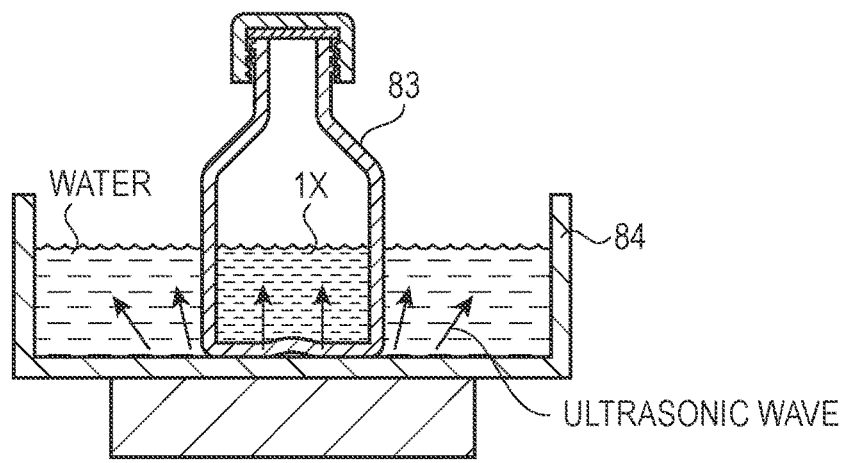
FIG. 4C is a schematic view showing the method for producing the lithium battery.

Polypropylene glycol acrylate (hereinafter sometimes abbreviated as "PPGAc") and Li-TFSI are mixed and stirred. At this time, the dissolution of Li-TFSI in PPGAc may be accelerated by improving the stirring efficiency using an ultrasonic generator 84. Specifically, as shown in FIG. 4C, PPGAc and Li-TFSI are placed in a reagent bottle made of PYREX (trademark of Corning Incorporated). The reagent bottle is immersed in the ultrasonic generator 84 containing water to apply ultrasonic. By doing this, Li-TFSI is dissolved in PPGAc, whereby the first solution 1X is obtained.

In the step S3, the first solution 1X and a polymerization initiator are mixed, whereby the second solution 2X is prepared. The polymerization initiator is not particularly limited as long as it can initiate the polymerization reaction at a carbon-carbon double bond included in polyalkylene glycol (meth)acrylate and vinyl sulfonic acid. Such a polymerization initiator is a compound which generates an active species such as a radical, a cation, or an anion by an energy ray such as light or heat, and examples thereof include thermal polymerization initiators such as a thermal radical polymerization initiator and a thermal cationic polymerization initiator, and photopolymerization initiators such as a radical photopolymerization initiator, a cationic photopolymerization initiator, and an anionic photopolymerization initiator. That is, as the polymerization initiator, at least one type of the thermal polymerization initiators and the photopolymerization initiators is used.

Examples of the thermal radical polymerization initiator include azo-based thermal polymerization initiators such as 2,2'-azobis(butyronitrile) (AIBN), 1,1'-azobis(cyclohexane-1-carbonitrile) (V-40), 2,2'-azobis(2,4-dimethylvaleronitrile) (ADVN or AMVN), 2,2'-azobis(2-methylbutyronitrile) (AMBN), 4,4'-azobis(4-cyanovaleric acid) (ACVA), 2,2'-azobis(2-methylpropionamidine)dihydrochloride (AAPH), 2,2'-azobis[2-(2-imidazolin-2-yl)propane]dihydrochloride, and dimethyl 2,2'-azobis[2-methylpropionate, peroxide-based thermal polymerization initiators such as benzoyl peroxide (BPO), tert-butyl hydroperoxide (TBHP), cumene hydroperoxide, di-tert-butyl peroxide, and dicumyl peroxide.

Examples of the thermal cationic polymerization initiator include dicyandiamide, cyclohexyl p-toluenesulfonate, and diphenyl(methyl)sulfonium tetrafluoroborate.

Examples of the radical photopolymerization initiator include acetophenone, p-anisyl, benzyl, benzoin, benzophenone, 2-benzoyl benzoate, 4,4'-bis(dimethylamino)benzophenone, 4,4'-bis(diethylamino)benzophenone, benzoin methyl ether, benzoin ethyl ether, benzoin isopropyl ether, benzoin isobutyl ether, 4-benzoyl benzoate, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, and 2,2-dimethoxy-2-phenylacetophenone (trade name "Irgacure 651", BASF SE).

Examples of the cationic photopolymerization initiator include bis(4-tert-butylphenyl)iodonium hexafluorophosphate, bis(4-tert-butylphenyl)iodonium trifluoromethanesulfonate, cyclopropyldiphenylsulfonium tetrafluoroborate, diphenyliodonium hexafluoroarsenate, diphenyliodonium hexafluorophosphate, diphenyliodonium trifluoromethanesulfonate, 2-(4-methoxyphenyl)-4,6-bis(trichloromethyl)-1, 3,5-triazine, triphenylsulfonium tetrafluoroborate, tri-p-tolylsulfonium hexafluorophosphate, and 4-nitrobenzenediazonium tetrafluoroborate.

Examples of the anionic photopolymerization initiator include acetophenone O-benzoyloxime, 1,2-bis(4-methoxyphenyl)-2-oxoethyl cyclohexylcarbamate nifedipine, 2-nitrobenzyl cyclohexylcarbamate, and 2-(9-oxoxanthen-2-yl) propionic acid 1,5,7-triazabicyclo[4.4.0]dec-5-ene.

In this embodiment, in order to form a (vinyl sulfonate-PPGAc) copolymer as the polyelectrolyte composition of the above formula (1) by copolymerizing vinyl sulfonic acid and PPGAc, a thermal polymerization reaction is used. Therefore, as the polymerization initiator, AIBN which is a thermal radical polymerization initiator is used. The method for forming the polyelectrolyte composition of the above formula (1) is not limited to the thermal polymerization reaction, and may be a polymerization reaction using an energy ray such as light, and heat and an energy ray may be used in combination. Therefore, as the above-mentioned polymerization initiator, one type alone is used or a plurality of types are used in combination according to the type of the polymerization reaction to be applied, the type of the polyalkylene glycol (meth)acrylate, the compositional ratio of vinyl sulfonic acid and polyalkylene glycol (meth)acrylate, or the like.

The first solution 1X and AIBN as the thermal radical polymerization initiator are mixed and stirred. At this time, in the same manner as in the step S2, the dissolution of AIBN in the first solution 1X may be accelerated by improving the stirring efficiency using the ultrasonic generator 84. By doing this, AIBN is completely dissolved in the first solution 1X, and the second solution 2X is obtained.

Figure 4D:
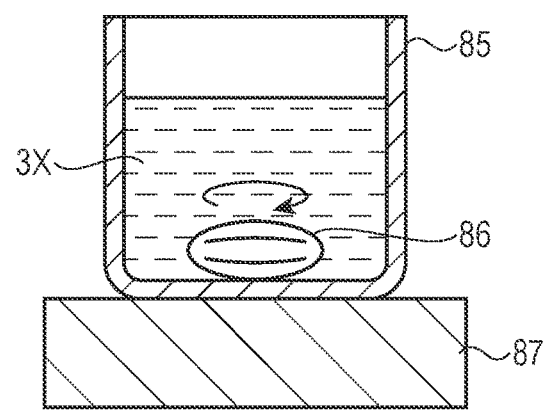
FIG. 4D is a schematic view showing the method for producing the lithium battery.

In the step S4, the second solution 2X and vinyl sulfonic acid are mixed, whereby the precursor solution 3X of the polyelectrolyte 3 is prepared. Specifically, for example, as shown in FIG. 4D, the second solution 2X and vinyl sulfonic acid (Asahi Kasei Finechem Co., Ltd.) are placed in a beaker 85 made of PYREX, and a magnetic stirring bar 86 is placed therein, and the components are mixed while stirring by a magnetic stirrer 87. By doing this, the precursor solution 3X is obtained.

Here, the molar ratios of vinyl sulfonic acid and PPGAc contained in the precursor solution 3X are set to be the same as m and n in the above formula (1). That is, when m and n are set as follows: m+n=10, m and n satisfy the following formulae: $1 \leq m \leq 5$ and $5 \leq n \leq 9$, preferably $2.5 \leq m \leq 5$ and $5 \leq n \leq 8.5$. According to this, a (vinyl sulfonate-PPGAc) copolymer as the polyelectrolyte composition of the above formula (1) can be obtained.

The content of the polymerization initiator contained in the precursor solution 3X can be appropriately adjusted according to the formulation of the polyelectrolyte composition or the type of the polymerization initiator. The content of the polymerization initiator is not particularly limited, however, specifically, in the above formula (1), when m and n are set as follows: m+n=10, the content of the polymerization initiator is preferably set to 0.02 or more and 0.05 or less in molar ratio. By setting the content of the polymerization initiator in the above range, the polymerization reaction (copolymerization) is accelerated, and the amount of unreacted vinyl sulfonic acid or PPGAc in the polyelectrolyte can be reduced.

The content of the lithium salt compound contained in the precursor solution 3X can be appropriately adjusted according to a desired lithium ion conduction property in the lithium battery 100 or the like. The content of the lithium salt compound is not particularly limited, however, specifically, in the above formula (1), when m and n are set as follows: m+n=10, the content of the lithium salt compound is preferably set to 1 or more and 3 or less in molar ratio. By setting the content of the lithium salt compound in the above range, the lithium ion conduction property in the polyelectrolyte is ensured, and the battery capacity of the lithium battery 100 can be further improved.

Figure 4E:
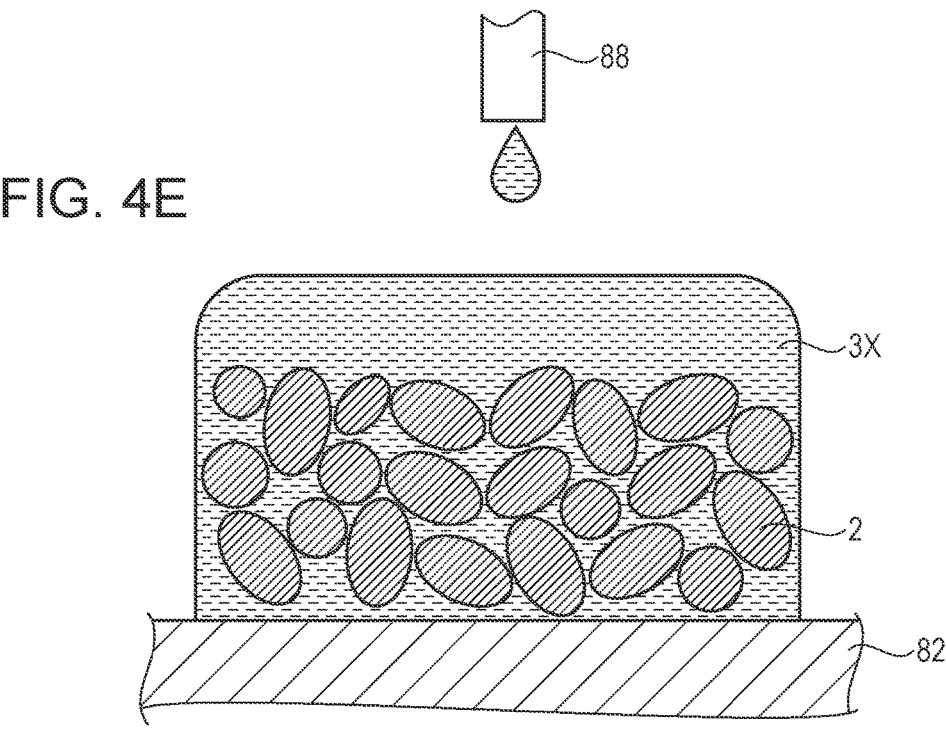
FIG. 4E is a schematic view showing the method for producing the lithium battery.

In the step S5, the precursor solution 3X and the active material section 2 are brought into contact with each other, and the precursor solution 3X is applied to the active material section 2. Specifically, as shown in FIG. 4E, by using a micropipette 88 for the active material section 2 on the substrate 82, the precursor solution 3X is applied to the surface including the inside of the pores of the active material section 2.

As a method for applying the precursor solution 3X, other than dropping using the micropipette 88, for example, a method such as immersion, spraying, penetration by capillary phenomenon, or spin coating can be used, and these methods may be performed in combination. The precursor solution 3X has fluidity, and therefore also easily reaches the inside of the pores of the active material section 2. At this time, the precursor solution 3X is applied so as to wet and spread on the entire surface including the inside of the pores of the active material section 2.

Figure 4F:
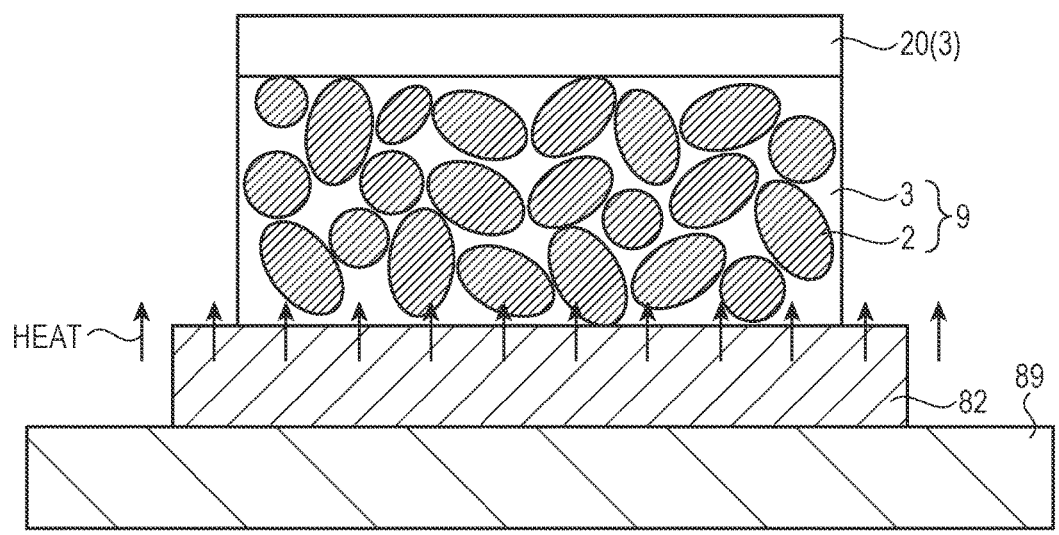
FIG. 4F is a schematic view showing the method for producing the lithium battery.

In the step S6, first, the precursor solution 3X brought into contact with the active material section 2 is heated to cause a polymerization reaction to form the polyelectrolyte 3, whereby the positive electrode 9 in which the polyelectrolyte 3 and the active material section 2 are assembled is formed. Specifically, as shown in FIG. 4F, the active material section 2 to which the precursor solution 3X is applied is placed on a hot plate 89 along with the substrate 82, and a heating treatment is performed. At this time, as the heating atmosphere, a dry inert gas atmosphere such as argon or $N_2$ is employed. It is preferred to employ an atmosphere in which oxygen is contained as little as possible.

The conditions for the heating treatment such as temperature and time are not particularly limited, and can be appropriately adjusted according to the property of the polymerization initiator used in the precursor solution 3X such as a 10-hour half-life temperature. The heating treatment conditions are set, for example, as follows: 60° C. or higher and 90° C. or lower and 30 minutes or more and 2 hours or less. By the heating treatment, an active species (radical) is generated from AIBN (thermal radical polymerization initiator) contained in the precursor solution 3X. By this radical, the polymerization reaction (copolymerization) of vinyl sulfonic acid and PPGAc proceeds, whereby a (vinyl sulfonate-PPGAc) copolymer (polyelectrolyte composition) is produced. Further, Li-TFSI (lithium salt compound) is deposited while being distributed in the polyelectrolyte 3 as the polymerization reaction proceeds from a state where it is dissolved in the precursor solution 3X.

Subsequently, the electrolyte section 20 is formed so as to be in contact with the positive electrode 9. In this embodiment, the polyelectrolyte 3 is used as the forming material of the electrolyte section 20, and therefore, simultaneously with the formation of the positive electrode 9 described above, the electrolyte section 20 is formed. Specifically, in the above-mentioned step S5, the active material section 2 is sunk in the precursor solution 3X by adjusting the amount of the precursor solution 3X to be dropped onto the active material section 2. By performing the heating treatment in the step S6 in this state, the electrolyte section 20 in which the active material section 2 (active material 2b) is not contained can be formed on the ceiling surface (the surface on which the precursor solution 3X is dropped using the micropipette 88) of the positive electrode 9. The electrolyte section 20 is not necessarily formed simultaneously with the positive electrode 9, and may be separately formed using a known method.

In the step S7, the negative electrode 30 is formed so as to be in contact with the electrolyte section 20. As a method for forming the negative electrode 30, other than a solution process such as a so-called sol-gel method or an organometallic thermal decomposition method involving a hydrolysis reaction or the like of an organometallic compound, a CVD (Chemical Vapor Deposition) method using an appropriate metal compound and a gas atmosphere, an ALD (Atomic Layer Deposition) method, a green sheet method or a screen printing method using a slurry of solid electrolyte particles, an aerosol deposition method, a sputtering method using an appropriate target and a gas atmosphere, a PLD (Pulsed Laser Deposition) method, a vacuum deposition method, plating, thermal spraying, or the like can be used. As the forming material of the negative electrode 30, the above-mentioned negative electrode active material can be adopted. In this embodiment, the negative electrode 30 is formed by depositing lithium (Li metal) having a thickness of about 3 µm using a vacuum deposition method.

Figure 4G:
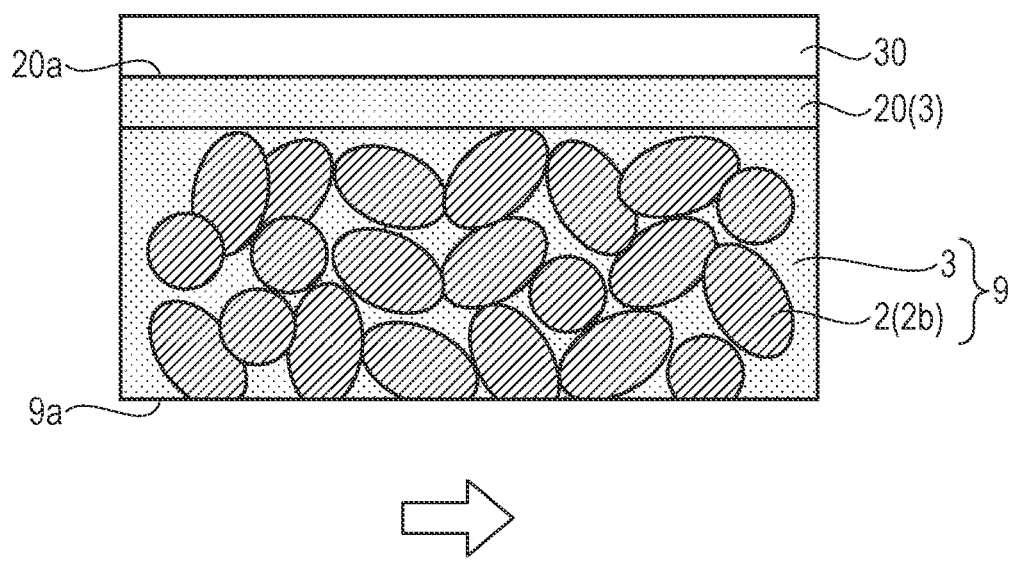
FIG. 4G is a schematic view showing the method for producing the lithium battery.

In the step S8, the first current collector 41 is formed so as to be in contact with one surface 9a of the positive electrode 9. First, as shown in FIG. 4G, a surface facing the surface on which the electrolyte section 20 is formed of the positive electrode 9 is polished under an inert gas atmosphere such as $N_2$. At this time, by polishing, the active material section 2 is surely exposed to form the one surface 9a. By doing this, the active material 2b is electrically connected to the first current collector 41. In the case where the active material section 2 is sufficiently exposed on the facing surface in the above-mentioned step, the polishing is omitted, and the facing surface may be used as the one surface 9a.

The polishing method is not particularly limited. For example, for the polishing, a wrapping film sheet #15000 (3M Company, abrasive grain diameter: 0.3 µm) is used as an abrasive, and the one surface 9a is formed by performing a mechanical polishing process.

Subsequently, the first current collector 41 is deposited (formed) on the one surface 9a. As a method for forming the first current collector 41, an appropriate method can be used according to the reactivity with the surface on which the first current collector 41 is formed, an electrical conduction property desired for the electrical circuit, and the design of the electrical circuit, for example, a method in which an appropriate adhesive layer is separately provided to adhere the first current collector 41, a gas-phase deposition method such as a PVD (Physical Vapor Deposition) method, a CVD method, a PLD method, an ALD method, an aerosol deposition method, or a sputtering method using an appropriate target and a gas atmosphere, a wet method such as a sol-gel method, an organometallic thermal decomposition method, or plating, or the like. Further, as the forming material of the first current collector 41, the above-mentioned forming material can be adopted. In this embodiment, the first current collector 41 is formed by depositing gold (Au) using a sputtering method. By undergoing the above-mentioned steps, the lithium battery 100 is produced.

As described above, by the polyelectrolyte composition, the polyelectrolyte 3, the method for producing the polyelectrolyte 3, the lithium battery 100 as the battery, and the method for producing the lithium battery 100 according to the above-mentioned embodiment, the following effects can be obtained.

According to the above-mentioned embodiment, by using the (vinyl sulfonate-PPGAc) copolymer which is the polyelectrolyte composition of the above formula (1) in the polyelectrolyte 3, the polyelectrolyte 3 having an excellent ion conduction property can be provided or produced. Specifically, the polyelectrolyte has a sulfone group with a relatively high polarity, and therefore, ion dissociation is promoted to decrease the internal resistance, and thus, the ion conduction property is improved. Further, the polyelectrolyte has a side chain having a polypropylene glycol structure in addition to a linear carbon main chain, and therefore, the molecular structure is not bulky as compared with, for example, an aromatic ring structure or an aliphatic ring structure, and the polyelectrolyte is rich in flexibility. Therefore, an ion transfer pathway is easily ensured, and the ion conduction property can be further improved. Therefore, in the lithium battery 100, the lithium ion conduction property is improved, and the battery capacity can be increased.

According to the above-mentioned embodiment, an ion transfer pathway is ensured by the (vinyl sulfonate-PPGAc) copolymer, and the ionic activity coefficient of the lithium salt compound is increased. That is, an ion transfer pathway corresponding to the increased ionic activity coefficient is ensured, and therefore, ionic activation is promoted, and thus, the lithium ion conduction property can be improved. According to this, the polyelectrolyte 3 suitable for the lithium battery 100 can be provided.

According to the above-mentioned embodiment, the (vinyl sulfonate-PPGAc) copolymer has a low glass transition point and is rich in flexibility as compared with, for example, a (vinyl sulfonate-PEGMAc) copolymer or the like, and therefore, by using the (vinyl sulfonate-PPGAc) copolymer in the lithium battery 100, the strength against physical stress such as impact can be improved.

According to the above-mentioned embodiment, the polyelectrolyte 3 containing the polyelectrolyte composition formed from vinyl sulfonic acid and PPGAc is formed. That is, the polyelectrolyte 3 having an improved lithium ion conduction property can be produced. Further, by mixing PPGAc and Li-TFSI as the first solution 1X, the solubility of Li-TFSI can be improved. Therefore, the time required for the step of preparing the precursor solution 3X of the polyelectrolyte 3 is reduced, and the production time for the polyelectrolyte 3 and the lithium battery 100 can be reduced. Further, Li-TFSI can be dispersed in the (vinyl sulfonate-PPGAc) copolymer while suppressing uneven distribution therein. According to this, a method for producing the polyelectrolyte 3 and the lithium battery 100, in which the lithium ion conduction property is improved, and for which the production time can be reduced, can be provided.

According to the above-mentioned embodiment, the polyelectrolyte 3 and the active material section 2 form an assembly, and therefore, a contact area between the polyelectrolyte 3 and the active material section 2 is increased to reduce the interface impedance. According to this, a method for producing the lithium battery 100 capable of achieving favorable charge transfer at the interface between the polyelectrolyte 3 and the active material section 2 can be provided.

Next, the effects of the above-mentioned embodiment will be more specifically described by showing Examples and Comparative Examples with respect to the lithium battery 100 according to the above-mentioned embodiment. FIG. 5 is a table showing the compositions of polyelectrolytes according to Examples and Comparative Examples. The weight measurement in the experiment in this specification was performed to the first decimal place in mg using an analytical balance ME204T (Mettler Toledo International, Inc.).

Production of Lithium Battery

Example 1

The lithium battery 100 of Example 1 was produced using the production method and the forming materials of the first embodiment described above. Here, the procedure from the preparation of a precursor solution 3X of a polyelectrolyte 3 to the formation of a positive electrode 9 and an electrolyte section 20 will be specifically described. As shown in FIG. 5, in the polyelectrolyte 3 (precursor solution 3X) of Example 1, PPGAc and vinyl sulfonic acid were mixed in equimolar amounts. That is, in the above formula (1), when m and n are set as follows: m+n=10, m and n satisfy the following formula: m=n=5.

In a reagent bottle made of PYREX (volume: 5 mL), PPGAc (1.3870 g, $2.92 \times 10^{-3}$ mol) and Li-TFSI (0.4134 g, $1.44 \times 10^{-3}$ mol) were weighed and placed. Here, the amount: $1.44 \times 10^{-3}$ mol of Li-TFSI corresponds to a molar ratio of about 2.47 when m and n are set as follows: m+n=10 in the above formula (1). The reagent bottle was immersed in an ultrasonic generator containing water, and ultrasonic was applied at room temperature for 1.5 hours to dissolve Li-TFSI in PPGAc, whereby a first solution 1X was obtained.

AIBN (0.0040 g, $2.42 \times 10^{-5}$ mol) was weighed and added to the first solution 1X, and then, the bottle was immersed again in the ultrasonic generator, and ultrasonic was applied at room temperature for 15 minutes to completely dissolve AIBN in the first solution 1X, whereby a second solution 2X was obtained. Here, the amount: $2.42 \times 10^{-5}$ mol of AIBN corresponds to a molar ratio of about 0.041 when m and n are set as follows: m+n=10 in the above formula (1).

Vinyl sulfonic acid (0.3157 g, $2.92 \times 10^{-3}$ mol) was weighed and added to the second solution 2X, and then, a magnetic stirring bar 86 was placed therein. In this state, stirring was performed at room temperature for 15 minutes using a magnetic stirrer 87, whereby a precursor solution 3X of Example 1 was prepared. In order to accelerate the polymerization reaction in the precursor solution 3X, the amount of dissolved oxygen may be reduced by subjecting the precursor solution 3X to a degassing treatment.

Subsequently, an active material section 2 of $LiCoO_2$ prepared by the method described in the first embodiment was placed on a substrate 82 (made of magnesium oxide), and the resulting material was placed on a hot plate 89. By using a micropipette 88, 6 μL of the precursor solution 3X was dropped from the upper side of the active material section 2. In this state, the resulting material was left to stand for 10 minutes, and thereafter, the set temperature of the hot plate 89 was increased to 85° C., and a heating treatment was performed for 1 hour. Thereafter, the temperature was gradually decreased to room temperature, whereby a positive electrode 9 including an electrolyte section 20 was obtained. The positive electrode 9 including the electrolyte section 20 was used as a sample for measurement of a lithium ion conductivity (hereinafter also referred to as "ion conductivity sample"). Further, separately, the lithium battery 100 of Example 1 was produced by applying the production method of the post-process of the first embodiment described above to the ion conductivity sample.

Example 2

With respect to the lithium battery 100 of Example 2, the same procedure as in Example 1 was performed except that the precursor solution 3X was prepared using vinyl sulfonic acid (0.1351 g, $1.25 \times 10^{-3}$ mol), Li-TFSI (0.2957 g, $1.03 \times 10^{-3}$ mol), and AIBN (0.0028 g, $1.73 \times 10^{-5}$ mol) as shown in FIG. 5 in contrast to Example 1, whereby an ion conductivity sample and the lithium battery 100 of Example 2 were produced. Therefore, in the polyelectrolyte composition (precursor solution 3X) of Example 2, in the above formula (1), when m and n are set as follows: m+n=10, m and n satisfy the following formulae: m=3 and n=7, and the molar ratio of Li-TFSI corresponds to about 1.76, and the molar ratio of AIBN corresponds to about 0.030.

Example 3

With respect to the lithium battery 100 of Example 3, the same procedure as in Example 1 was performed except that the precursor solution 3X was prepared using vinyl sulfonic acid (0.0789 g, $7.30 \times 10^{-4}$ mol), Li-TFSI (0.2578 g, $8.98 \times 10^{-4}$ mol), and AIBN (0.0025 g, $1.51 \times 10^{-5}$ mol) as shown in FIG. 5 in contrast to Example 1, whereby an ion conductivity sample and the lithium battery 100 of Example 3 were produced. Therefore, in the polyelectrolyte composition (precursor solution 3X) of Example 3, in the above formula (1), when m and n are set as follows: m+n=10, m and n satisfy the following formulae: m=2 and n=8, and the molar ratio of Li-TFSI corresponds to about 1.54, and the molar ratio of AIBN corresponds to about 0.026.

Example 4

With respect to the lithium battery 100 of Example 4, the same procedure as in Example 1 was performed except that the precursor solution 3X was prepared using vinyl sulfonic acid (0.0350 g, $3.24 \times 10^{-4}$ mol), Li-TFSI (0.2288 g, $7.97 \times 10^{-4}$ mol), and AIBN (0.0022 g, $1.34 \times 10^{-5}$ mol) as shown in FIG. 5 in contrast to Example 1, whereby an ion conductivity sample and the lithium battery 100 of Example 4 were produced. Therefore, in the polyelectrolyte composition (precursor solution 3X) of Example 4, in the above formula (1), when m and n are set as follows: m+n=10, m and n satisfy the following formulae: m=1 and n=9, and the molar ratio of Li-TFSI corresponds to about 1.36, and the molar ratio of AIBN corresponds to about 0.023.

Comparative Example 1

With respect to a lithium battery of Comparative Example 1, the same procedure as in Example 1 was performed except that a precursor solution was prepared by setting the amount of vinyl sulfonic acid to 0.0000 g, that is, without blending vinyl sulfonic acid, and using Li-TFSI (0.2061 g, $7.18 \times 10^{-4}$ mol) and AIBN (0.0020 g, $1.21 \times 10^{-5}$ mol) as shown in FIG. 5 in contrast to Example 1, whereby an ion conductivity sample and the lithium battery of Comparative Example 1 were produced. Therefore, in the polyelectrolyte composition (precursor solution) in Comparative Example 1, in the above formula (1), when m and n are set as follows: m+n=10, m and n satisfy the following formulae: m=0 and n=10, and the molar ratio of Li-TFSI corresponds to about 1.23, and the molar ratio of AIBN corresponds to about 0.021. The polyelectrolyte of Comparative Example 1 does not satisfy the following formula: 1≤m≤5.

Comparative Example 2

With respect to a lithium battery of Comparative Example 2, vinyl sulfonic acid (0.3860 g, $3.57 \times 10^{-3}$ mol), Li-TFSI (0.4593 g, 1.60×10$^{-3}$ mol), and AIBN (0.0044 g, 2.69×10$^{-5}$ mol) were used as shown in FIG. 5 in contrast to Example 1, however, Li-TFSI was not dissolved in PPGAc, and a precursor solution could not be prepared. In the formulation of the polyelectrolyte composition of Comparative Example 2, in the above formula (1), when m and n are set as follows: m+n=10, m and n satisfy the following formulae: m=5.5 and n=4.5, and the molar ratio of Li-TFSI corresponds to about 2.73, and the molar ratio of AIBN corresponds to about 0.046. The polyelectrolyte of Comparative Example 2 does not satisfy the following formulae: 1≤m≤5 and 5≤n≤9.

Evaluation Methods and Evaluation Results

With respect to the ion conductivity samples and the lithium batteries of Examples and Comparative Examples, evaluation was performed by the following methods, and the results are shown in FIG. 6. FIG. 6 is a table showing the evaluation results of the lithium ion conduction property according to Examples and Comparative Examples.

Lithium Ion Conduction Property

A lithium foil having a diameter of 7 mm and a thickness of 50 μm was pressed against both front and back surfaces of each ion conductivity sample to form an electrode, and further, a copper foil having a diameter of 7 mm and a thickness of 30 μm was pressed against both surfaces of electrode to form a sample for measurement. Subsequently, by using an impedance analyzer SI 1260 (Solartron, Inc.), the AC impedance of the sample for measurement was measured at an AC voltage amplitude of 10 mV and a measurement frequency ranging from 10$^{-7}$ Hz to 10$^{-2}$ Hz. From a Cole-Cole plot which is the obtained impedance spectrum, the total ion conductivity was calculated as the index of the lithium ion conduction property. The total ion conductivity of each of the ion conductivity samples of Examples and Comparative Examples are shown in FIG. 6. Further, the total ion conductivity was evaluated according to the following criteria. The results are shown in FIG. 6.

A: The total ion conductivity is 7.0×10$^{-6}$ or more.
B: The total ion conductivity is 2.0×10$^{-6}$ or more and less than 7.0×10$^{-6}$.
C: The total ion conductivity is 7.0×10$^{-7}$ or more and less than 2.0×10$^{-6}$.
D: The total ion conductivity is less than 7.0×10$^{-7}$.

As shown in FIG. 6, Examples 1 to 3 were evaluated as A which corresponds to "very suitable", and Example 4 was evaluated as B which corresponds to "suitable". According to this, it was shown that Examples 1 to 4 have an excellent lithium ion conduction property.

On the other hand, Comparative Example 1 was evaluated as C which corresponds to "not suitable", and therefore, it was found that Comparative Example 1 has a lower lithium ion conduction property than Examples. Further, it was found that in Comparative Example 2, a lithium battery could not be produced.

Charge/Discharge Capacity

With respect to the lithium battery 100 of Example 1 and the lithium battery of Comparative Example 1, charge and discharge were performed at a charge/discharge rate of 0.1 C in an environment at 25° C. As a result, in both of the lithium battery 100 of Example 1 and the lithium battery of Comparative Example 1, a plateau of a charge curve was observed at 3.9 V. This potential was equal to the potential of the desorption reaction of lithium of HT (high-temperature phase)-LiCoO$_2$.

Further, with respect to the lithium battery 100 of Example 1 and the lithium battery of Comparative Example 1, a charge/discharge capacity in the case where charge and discharge were repeated was measured. Specifically, an initial charge/discharge capacity and a charge/discharge capacity after repeating 100 cycles of charge and discharge were measured, and a discharge capacity maintenance rate after 100 cycles of charge and discharge was calculated. The theoretical capacity (the withdrawal amount of lithium atoms in the composition of LiCoO$_2$) is 137 mAh/g.

As a result of the above evaluation, it was found that in the lithium battery 100 of Example 1, 80% (110 mAh/g) of the above-mentioned theoretical capacity (137 mAh/g) can be ensured. Further, it was found that the discharge capacity maintenance rate after repeating 100 cycles of charge and discharge can be maintained at 90% (99 mAh/g). These results showed that the lithium battery 100 of Example 1 has a stable cycle property.

On the other hand, in the configuration of Comparative Example 1, the initial resistance was too high, and it did not function as a battery.

Second Embodiment

Method for Producing Battery

Figure 7:
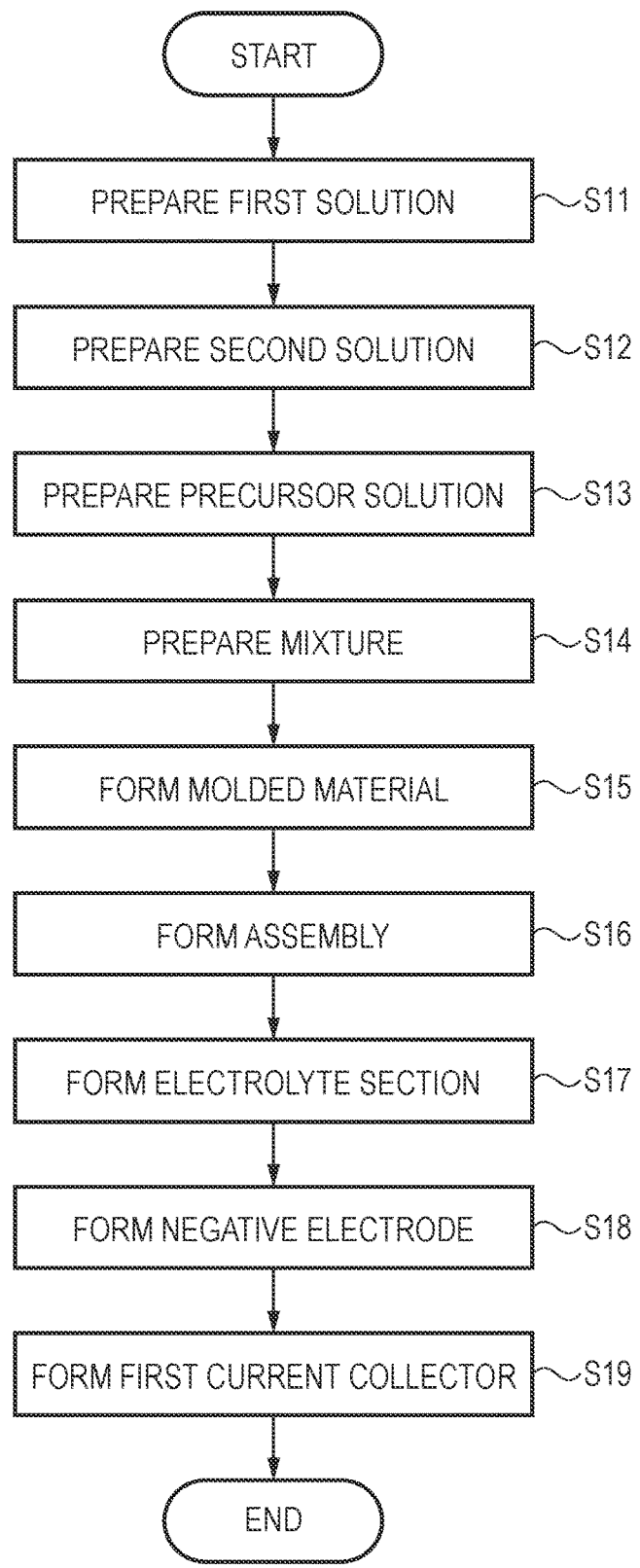
FIG. 7 is a process flowchart showing a method for producing a lithium battery as a battery according to a second embodiment.

A method for producing a lithium battery 200 according to this embodiment will be described with reference to FIGS. 7, 8A, 8B, 8C, and 8D. FIG. 7 is a process flowchart showing a method for producing a lithium battery as a battery according to the second embodiment. FIGS. 8A to 8D are schematic views showing the method for producing the lithium battery. Incidentally, the same reference numerals are used for the same constituent components as those of the first embodiment, and a repetitive description will be omitted. The process flow shown in FIG. 7 is an example, and the method is not limited thereto.

As shown in FIG. 7, the method for producing the lithium battery 200 of this embodiment includes a step S11 of preparing a first solution 21X by mixing polyalkylene glycol (meth)acrylate and a lithium salt compound, a step S12 of preparing a second solution 22X by mixing the first solution 21X and a polymerization initiator, a step S13 of preparing a precursor solution 23X of a polyelectrolyte 23 by mixing the second solution 22X and vinyl sulfonic acid, a step S14 of preparing a mixture 24X containing vinyl sulfonic acid, polyalkylene glycol (meth)acrylate, a lithium salt compound, a polymerization initiator, and an active material 2b in the form of particles by mixing the precursor solution 23X and the active material 2b in the form of particles, a step S15 of forming a molded material 24Y in the form of a sheet using the mixture 24X, a step S16 of forming an assembly 24 containing the active material 2b and the polyelectrolyte 23 obtained by polymerization of vinyl sulfonic acid and polyalkylene glycol (meth)acrylate using the molded material 24Y, a step S17 of forming an electrolyte section 220 so as to be in contact with the assembly 24, a step S18 of forming a negative electrode 230 so as to be in contact with the electrolyte section 220, and a step S19 of forming a first current collector 241 so as to be in contact with the assembly 24.

As described above, the method for producing the lithium battery 200 according to the second embodiment is different from the first embodiment in that the assembly 24 is directly formed from the mixture 24X using a so-called green sheet molding method without forming the active material section 2 as in the first embodiment.

The step S11 to the step S13 are performed in the same manner as the step S2 to the step S4 in the first embodiment, whereby the precursor solution 23X is prepared. As the forming materials and devices used in the step S11 to the step S13, the same forming materials and devices as in the first embodiment can be applied, and therefore, a detailed description thereof will be omitted. In this embodiment, the precursor solution 23X is prepared using the same forming materials as in the first embodiment except that polyethylene glycol methacrylate (number average molecular weight Mn: 360, Aldrich Co., Ltd.) (hereinafter sometimes abbreviated as "PEGMAc") is used as the polyalkylene glycol (meth) acrylate.

In the step S14, the precursor solution 23X and the active material 2b in the form of particles are mixed, whereby the mixture 24X in the form of a slurry is prepared. As the active material 2b, the particles of $LiCoO_2$ (Sigma-Aldrich Co., Ltd.) subjected to a classification operation so as to have an average particle diameter of about 5 μm are used in the same manner as in the first embodiment.

The mixture 24X preferably contains a conductive auxiliary agent 27. By adding the conductive auxiliary agent 27, the electron conduction property of the assembly 24 can be improved. Examples of the forming material of the conductive auxiliary agent 27 include conductive polymer compounds such as polythiophene, polyacetylene, polypyrrole, polyaniline, and poly(para-phenylene), each doped with a carrier such as a conductive ion, carbon fibers such as a PAN (polyacrylonitrile)-based or pitch-based carbon fibers, conductive carbon blacks, materials obtained by coating a glass fiber, a carbon fiber, or the like with a metal such as nickel (Ni) or Al (aluminum), metals or metalloids such as silicon (Si), manganese (Mn), iron (Fe), cobalt (Co), nickel (Ni), copper (Cu), gallium (Ga), yttrium (Y), zirconium (Zr), neodymium (Nd), molybdenum (Mo), ruthenium (Ru), rhodium (Rh), palladium (Pd), silver (Ag), hafnium (Hf), tantalum (Ta), tungsten (W), rhenium (Re), osmium (Os), iridium (Ir), a lanthanoid, platinum (Pt), gold (Au), stainless steel, and brass, and oxides such as $In_2O_3$, $SnO_2$, $Fe_2O_3$, CoO, ZnO, and $RuO_2$. In this embodiment, as the conductive auxiliary agent, Ketchen black (average particle diameter: about 100 nm, Lion Specialty Chemicals Co., Ltd.) which is a conductive carbon black is added. Incidentally, in the first embodiment, the active material section 2 in which the particles of the active material 2b are connected to each other is formed, and therefore, the electron conduction property is easily ensured, and thus, it is not necessary to use the conductive auxiliary agent 27.

First, the precursor solution 23X, the active material 2b, and Ketchen black are weighed and placed in a 50-mL bottle made of PYREX. At this time, the amount of the active material 2b is set to 90 parts by mass to 95 parts by mass, the amount of the conductive auxiliary agent 27 (Ketchen black) is set to 5 parts by mass to 10 parts by mass, so that the total amount of the active material 2b and the conductive auxiliary agent 27 is set to 100 parts by mass, and the amount of the precursor solution 23X is set to 50 parts by mass to 200 parts by mass. Subsequently, a magnetic stirring bar 86 is placed in the above-mentioned 50-mL bottle, and the components are mixed while stirring using a magnetic stirrer 87. By doing this, the mixture 24X is obtained.

Figure 8A:
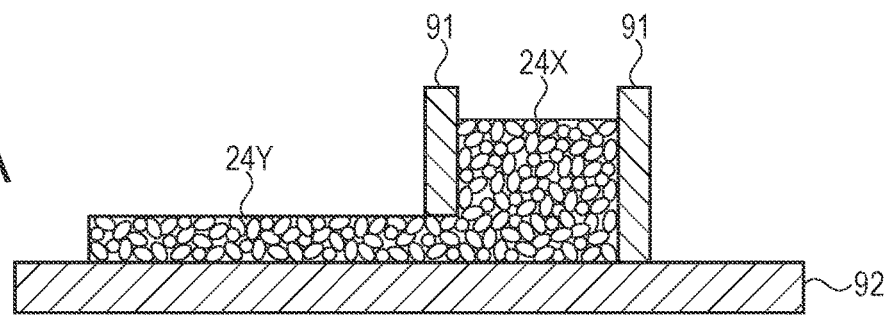
FIG. 8A is a schematic view showing the method for producing the lithium battery.

In the step S15, the molded material 24Y in the form of a sheet is formed using the mixture 24X. As shown in FIG. 8A, the mixture 24X is coated on a substrate 92 using a doctor blade molding machine 91 as a coating machine, whereby the molded material 24Y in the form of a sheet is formed. Here, the coating thickness of the molded material 24Y is adjusted so that the thickness of the below-mentioned assembly 24 is 20 μm to 100 μm. Incidentally, by setting the thickness of the substrate 92 to about 0.1 mm, and using the same forming material as that of the first current collector 41 described above for the substrate 92, the substrate 92 can be applied as the below-mentioned first current collector 241.

Figure 8B:
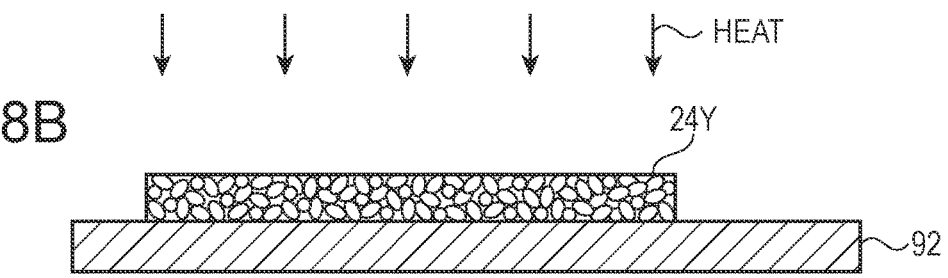
FIG. 8B is a schematic view showing the method for producing the lithium battery.

In the step S16, the assembly 24 as the positive electrode containing the polyelectrolyte 23 obtained by polymerization of vinyl sulfonic acid and PEGMAc, the active material 2b, and the conductive auxiliary agent 27 is formed from the molded material 24Y. As shown in FIG. 8B, the substrate 92 and the molded material 24Y are subjected to a heating treatment at 90° C. for about 1 hour. The heating atmosphere is set in the same manner as in the first embodiment.

By the heating treatment, an active species is generated from AIBN contained in the mixture 24X, and by the active species, a polymerization reaction (copolymerization) of vinyl sulfonic acid and PEGMAc proceeds. By this reaction, a (vinyl sulfonate-PEGMAc) copolymer as the polyelectrolyte composition of the above formula (1) is produced. Further, Li-TFSI (lithium salt compound) is deposited as the polymerization reaction proceeds from a state where it is dissolved in the mixture 24X, and forms the polyelectrolyte 23 along with the polyelectrolyte composition. The active material 2b and the conductive auxiliary agent 27 are distributed in the form of islands while coming into contact with each other, and the polyelectrolyte 23 is formed in a gap between the islands. By doing this, the assembly 24 of the active material 2b, the conductive auxiliary agent 27, and the polyelectrolyte 23 is obtained. Thereafter, the assembly 24 in the form of a sheet is cut out in the shape of a disk (diameter: about 10 mm) for each substrate 92. The substrate 92 is used as the first current collector 241. In the case where the substrate 92 is not used as the first current collector 241, after the substrate 92 is detached from the assembly 24, the first current collector 241 is provided in the same manner as the first current collector 41 of the first embodiment in the step S19.

Figure 8C:
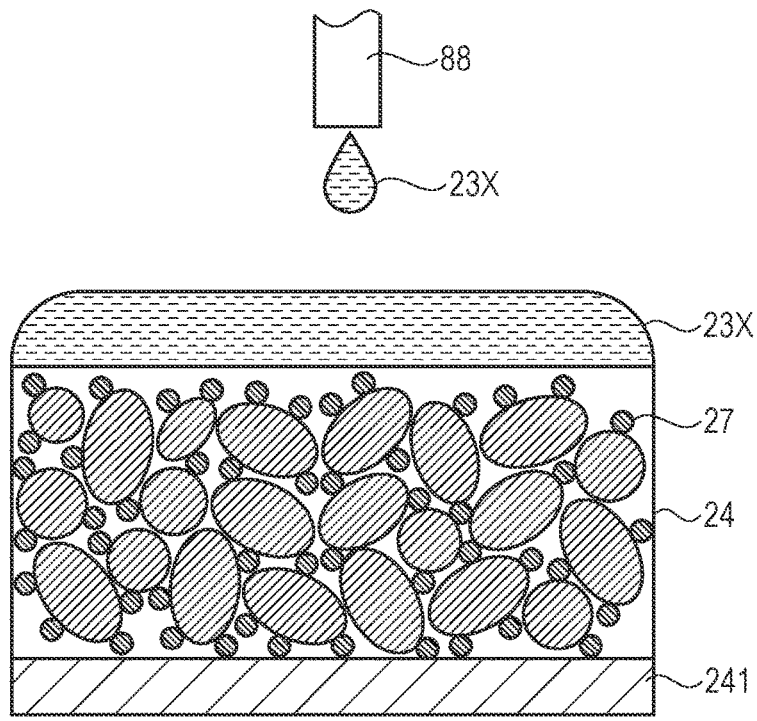
FIG. 8C is a schematic view showing the method for producing the lithium battery.

In the step S17, the electrolyte section 220 (see FIG. 8D) is formed so as to be in contact with the assembly 24. As the forming material of the electrolyte section 220, the polyelectrolyte 23 is used. As shown in FIG. 8C, in the same manner as the application of the precursor solution 3X in the first embodiment, the precursor solution 23X is applied onto the upper surface (the surface on the opposite side to the surface on which the first current collector 241 is formed) of the assembly 24, followed by a heating treatment, whereby the electrolyte section 220 is formed. By adjusting the contents of the active material 2b and the conductive auxiliary agent 27 in the mixture 24X, a layer (electrolyte section 220) which does not contain the active material 2b and the conductive auxiliary agent 27 may be formed on the ceiling surface of the assembly 24 simultaneously with the assembly 24 in the step S16.

Figure 8D:
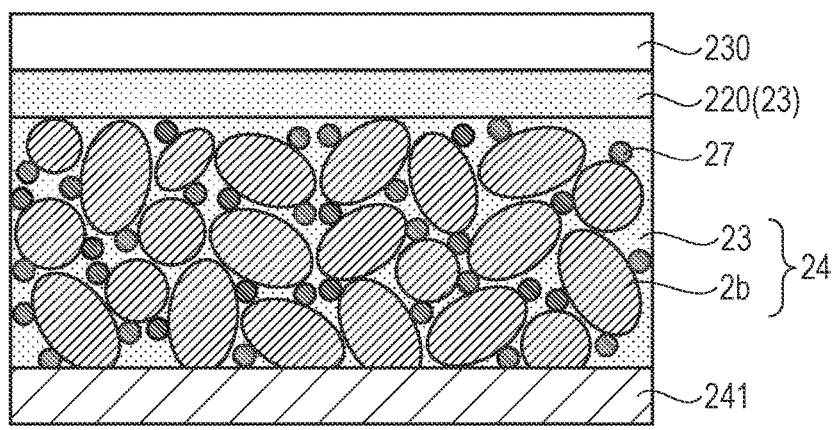
FIG. 8D is a schematic view showing the method for producing the lithium battery.

In the step S18, the negative electrode 230 is formed so as to be in contact with the electrolyte section 220. The negative electrode 230 can be formed using the same forming material and the same method as those for the negative electrode 30 of the first embodiment. The formation of the first current collector 241 in the step S19 can be performed in the step S16 as described above, and therefore, the description thereof will be omitted. By the above-mentioned steps, the lithium battery 200 shown in FIG. 8D is produced.

As described above, by the polyelectrolyte composition, the polyelectrolyte 23, the method for producing the polyelectrolyte 23, the lithium battery 200 as the battery, and the method for producing the lithium battery 200 according to the above-mentioned embodiment, the following effects can be obtained in addition to the effects of the first embodiment.

According to the above-mentioned embodiment, the lithium battery 200 containing the (vinyl sulfonate-PEG-MAc) copolymer which is the polyelectrolyte composition and Li-TFSI (lithium salt compound) as the polyelectrolyte 23, and having an improved lithium ion conduction property can be produced. Further, since the conductive auxiliary agent 27 is used, an electron conduction property can be ensured without forming the active material section 2 of the active material 2b as in the first embodiment. Further, since the assembly 24 containing the polyelectrolyte 23 and the active material 2b is directly formed, the production steps of the lithium battery 200 can be simplified.

Next, the effects of the above-mentioned embodiment will be more specifically described by showing Examples with respect to the lithium battery 200 according to the above-mentioned embodiment.

Production of Lithium Battery

Example 5

The lithium battery 200 of Example 5 was produced using the production method and the forming materials of the second embodiment described above. Here, the procedure from the preparation of a precursor solution 23X of a polyelectrolyte 23 to the formation of an assembly 24 and an electrolyte section 220 will be specifically described.

With respect to the lithium battery 200 of Example 5, the precursor solution 23X of Example 5 was prepared in the same manner as in Example 1 of the first embodiment except that PEGMAc (13.8700 g, $3.85 \times 10^{-2}$ mol), vinyl sulfonic acid (1.3510 g, $1.25 \times 10^{-2}$ mol), Li-TFSI (2.9570 g, $1.03 \times 10^{-2}$ mol), and AIBN (0.0280 g, $1.73 \times 10^{-4}$ mol) were used, and a reagent bottle made of PYREX (volume: 50 mL) was used in the preparation in contrast to Example 1. In the polyelectrolyte composition (precursor solution 23X) in Example 5, in the above formula (1), when m and n are set as follows: m+n=10, m and n satisfy the following formulae: m=3 and n=7, and the molar ratio of Li-TFSI corresponds to about 1.76, and the molar ratio of AIBN corresponds to about 0.030.

Subsequently, the precursor solution 23X (6.5000 g), $LiCoO_2$ particles (9.5000 g), and Ketchen black (0.5000 g) were weighed and placed in a reagent bottle made of PYREX (volume: 50 mL). Further, a magnetic stirring bar 86 was placed therein, and stirring was performed at room temperature for 15 minutes using a magnetic stirrer 87, whereby a mixture 24X in the form of a slurry was prepared.

Subsequently, a molded material 24Y in the form of a sheet was formed from the mixture 24X using a doctor blade molding machine 91 and an aluminum plate having a thickness of 0.1 mm as a substrate 92. Thereafter, the molded material 24Y was subjected to a heating treatment at 90° C. for 1 hour in a dry $N_2$ gas atmosphere, whereby an assembly 24 containing a (vinyl sulfonate-PEGMAc) copolymer as the polyelectrolyte composition was formed. The assembly 24 was cut out in the shape of a disk (diameter: about 10 mm, thickness: about 150 μm) for each aluminum plate to be used as a first current collector 241. Further, a negative electrode 230 was formed in the same manner as in the first embodiment, whereby the lithium battery 200 of Example 5 was produced.

Evaluation for Lithium Battery

With respect to the lithium battery 200 of Example 5, the same evaluation as in Example 1 of the first embodiment was performed. As a result, it was confirmed that the lithium battery 200 of Example 5 has equivalent performance to that of Example 1 in terms of charge/discharge capacity and discharge capacity maintenance rate.

Third Embodiment

Battery

Figure 9:
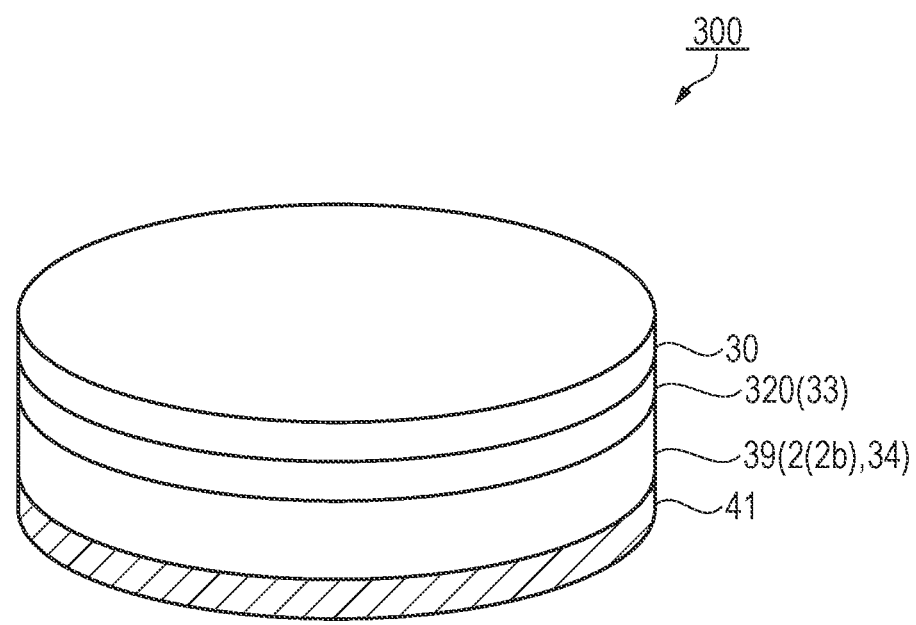
FIG. 9 is a schematic perspective view showing a configuration of a lithium battery as a battery according to a third embodiment.

First, a battery according to this embodiment will be described with reference to FIG. 9. In this embodiment, a lithium battery will be described as an example of the battery. FIG. 9 is a schematic perspective view showing a configuration of a lithium battery as the battery according to the third embodiment. Incidentally, the same reference numerals are used for the same constituent components as those of the first embodiment, and a repetitive description will be omitted.

As shown in FIG. 9, a lithium battery 300 of this embodiment includes an electrolyte section 320 which contains a polyelectrolyte 33, a positive electrode 39 as an assembly which is provided in contact with the electrolyte section 320 and contains an active material 2b and an electrolyte 34, a negative electrode 30 which is provided for the positive electrode 39 through the electrolyte section 320, and a first current collector 41 which is provided for the electrolyte section 320 through the positive electrode 39. The active material 2b forms the active material section 2 in the same manner as in the first embodiment.

The lithium battery 300 is different from the lithium battery 100 of the first embodiment in that the polyelectrolyte composition of the above formula (1) is not contained in the positive electrode 39. That is, in the lithium battery 300, as the forming material of the electrolyte section 320, the polyelectrolyte 33 containing the polyelectrolyte composition is used, and as the forming material of the electrolyte 34 contained in the positive electrode 39, a solid electrolyte other than the polyelectrolyte 33 is used.

In the lithium battery 300, for the negative electrode 30, the first current collector 41, and the active material section 2 composed of the active material 2b, the same forming materials as in the first embodiment are used. As the forming material of the electrolyte 34 contained in the positive electrode 39, any other solid electrolyte including a crystalline material or an amorphous material containing an oxide, a sulfide, a halide, a nitride, a hydride, a boride, or the like exemplified in the first embodiment is used.

The polyelectrolyte 33 contains the polyelectrolyte composition of the above formula (1) and a lithium salt compound in the same manner as in the first embodiment. As the polyelectrolyte composition and the lithium salt compound, the compounds exemplified in the first embodiment can be adopted.

Method for Producing Battery

Figure 10:
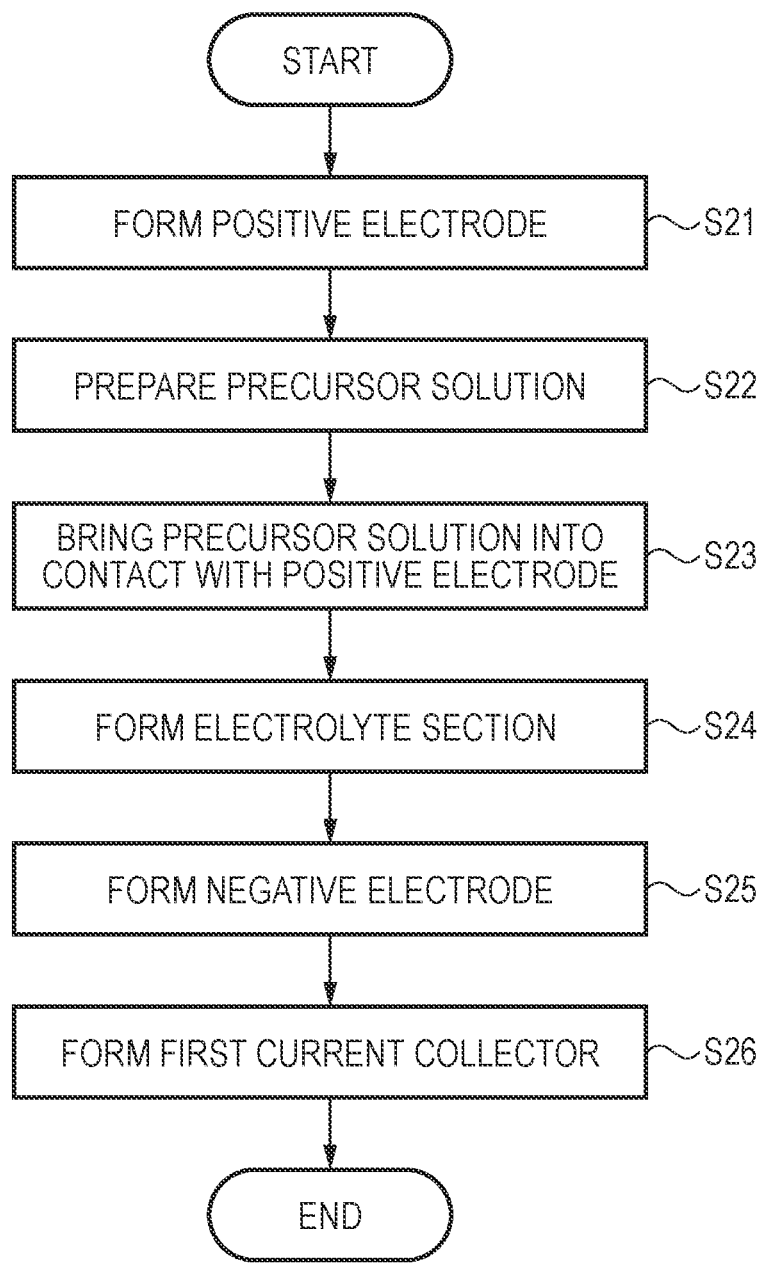
FIG. 10 is a process flowchart showing a method for producing the lithium battery.
Figure 11:
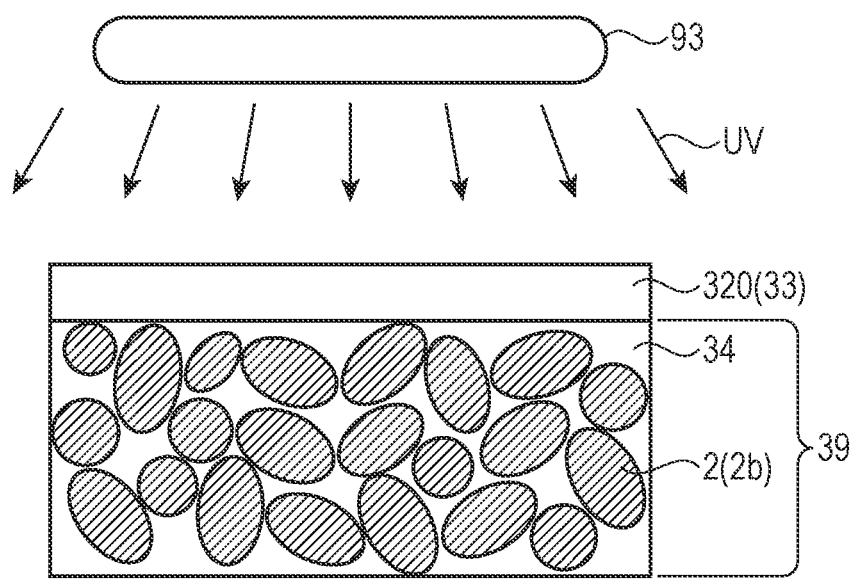
FIG. 11 is a schematic view showing the method for producing the lithium battery.

A method for producing the lithium battery 300 according to this embodiment will be described with reference to FIGS. 10 and 11. FIG. 10 is a process flowchart showing a method for producing the lithium battery. FIG. 11 is a schematic view showing the method for producing the lithium battery.

As shown in FIG. 10, the method for producing the lithium battery 300 includes a step S21 of forming a positive electrode 39 as an assembly containing an active material 2b and an electrolyte 34, a step S22 of preparing a precursor solution 33X of a polyelectrolyte 33 containing vinyl sulfonic acid, polyalkylene glycol (meth)acrylate, a lithium salt compound, and a polymerization initiator, a step S23 of bringing the precursor solution 33X into contact with the positive electrode 39, a step S24 of forming an electrolyte section 320 containing the polyelectrolyte 33 so as to be in contact with the positive electrode 39 by polymerizing the precursor solution 33X, a step S25 of forming a negative electrode 30 so as to be in contact with the electrolyte section 320, and a step S26 of forming a first current collector 41 for the electrolyte section 320 through the positive electrode 39.

In the step S21, the active material section 2 is formed using the active material 2b, and the active material section 2 and the electrolyte 34 are assembled to form the positive electrode 39. As a method for forming the active material section 2, the same method as the step S1 of the first embodiment can be adopted.

In order to assemble the electrolyte 34 and the active material section 2, first, a solution 34X containing a precursor of the electrolyte 34 (hereinafter also simply referred to as "precursor solution 34X") is prepared. As the precursor solution 34X, at least one type of the following (a), (b), (c), and (d) can be used. Among these, (b) is a precursor in the case where a solid electrolyte is formed using a sol-gel method.

(a) a composition having a salt which contains a metal atom included in a solid electrolyte at a proportion according to the compositional formula of the solid electrolyte and is converted into the solid electrolyte by oxidation (b) a composition having a metal alkoxide compound which contains a metal atom included in a solid electrolyte at a proportion according to the compositional formula of the solid electrolyte (c) a dispersion liquid in which a microparticle of a solid electrolyte or a microparticle sol containing a metal atom included in a solid electrolyte at a proportion according to the compositional formula of the solid electrolyte is dispersed in a solvent (d) a composition having a salt which contains a metal atom included in a solid electrolyte at a proportion according to the compositional formula of the solid electrolyte and is converted into the solid electrolyte by oxidation and having a metal alkoxide compound Subsequently, particles of the electrolyte 34 are prepared from the precursor solution 34X. The above-mentioned solution is heated and fired at 800° C. over 10 hours in pressurized dry air, whereby a solid material is prepared. Subsequently, this solid material is pulverized and classified, whereby particles of the electrolyte 34 having an average particle diameter of about 0.5 µm are obtained.

Subsequently, a melt of the particles of the electrolyte 34 is brought into contact with the active material section 2, whereby the electrolyte 34 is provided (formed) inside the pores of the active material section 2. First, the particles of the electrolyte 34 are placed above the active material section 2, and the particles of the electrolyte 34 are heated. The heating conditions are preferably such that heating is performed at a temperature of 800° C. or higher and 1000° C. or lower for 1 minute to 240 minutes. Further, the heating is preferably performed in dry air.

By heating the particles of the electrolyte 34 at a temperature exceeding the melting point thereof, the particles of the electrolyte 34 are melted into a melt. The melt covers the entire active material section 2 while penetrating into the inside of the pores of the active material section 2 from the upper surface of the active material section 2. As a method for heating the particles of the electrolyte 34, laser annealing may be used.

Here, the method for forming the electrolyte 34 in the positive electrode 39 is not limited to the above-mentioned method in which the melt of the particles of the electrolyte 34 is allowed to penetrate. Examples of other forming methods include immersion, dropping, spraying, penetration by capillary phenomenon, and spin coating using the precursor solution 34X, and by performing a heating treatment in a post-process, removal of the solvent in the solution and firing of the electrolyte 34 may be performed. Further, after providing the particles of the electrolyte 34 in the pores of the active material section 2, the electrolyte 34 may be formed by a heating treatment. Thereafter, the active material section 2 is left to cool so as to assemble the active material section 2 and the electrolyte 34, whereby the positive electrode 39 is formed. Incidentally, the method for forming the positive electrode 39 is not limited to the above-mentioned method, and for example, the positive electrode 39 may be formed using a green sheet molding method described in the second embodiment.

In the step S22, the precursor solution 33X of the polyelectrolyte 33 containing vinyl sulfonic acid, polyalkylene glycol (meth)acrylate, a lithium salt compound, and a polymerization initiator is prepared. The step S22 is performed in the same manner as in the step S2 to the step S4 of the first embodiment. Here, in this embodiment, the formation of the polyelectrolyte composition (polymerization reaction) is performed by irradiation with a UV ray (energy ray), and therefore, among the above-mentioned polymerization initiators, at least any of a radical photopolymerization initiator, a cationic photopolymerization initiator, and an anionic photopolymerization initiator is used.

In the step S23, the precursor solution 33X is brought into contact with the positive electrode 39, whereby the precursor solution 33X is applied to the positive electrode 39. Specifically, in the same manner as in the step S5 (see FIG. 4E) of the first embodiment, the precursor solution 33X is applied onto the ceiling surface of the positive electrode 39 placed on the substrate 82 using the micropipette 88. At this time, the precursor solution 33X may be applied in an amount sufficient for forming the electrolyte section 320.

As the method for applying the precursor solution 33X, other than dropping using the micropipette 88, for example, a method such as immersion, spraying, penetration by capillary phenomenon, spin coating, or the like can be used, and these methods may be performed in combination.

In the step S24, the electrolyte section 320 containing the polyelectrolyte 33 is formed so as to be in contact with the positive electrode 39 by polymerizing the precursor solution 33X. In this embodiment, a polymerization reaction of vinyl sulfonic acid and polyalkylene glycol (meth)acrylate is performed by UV irradiation. Therefore, as shown in FIG. 11, the precursor solution 33X applied to the positive electrode 39 is irradiated with a UV (Ultraviolet) ray from a UV irradiation device 93.

As a light source (UV light generation system) in the UV irradiation device 93, for example, a mercury lamp, a metal halide lamp, a UV light-emitting diode (UV-LED), a UV laser diode (UV-LD), or the like can be used.

The wavelength of the light source can be set according to the absorption wavelength of the polymerization initiator or the like, and is not limited, however, the emission peak wavelength of the light source is preferably, for example, in the range of 200 nm to 400 nm. The emission peak wavelength refers to a wavelength at which the light emission intensity becomes the maximum. It is preferred to irradiate a UV ray having the above emission peak wavelength at an irradiation energy of 50 mJ/cm$^2$ or more and 400 mJ/cm$^2$ or less.

The UV irradiation time for the precursor solution 33X can be appropriately adjusted according to the irradiation energy of the UV ray to be irradiated, the type of the polymerization initiator, the thickness of the electrolyte section 320 to be formed, or the like. The UV irradiation time is not particularly limited, but can be set to, for example, 30 seconds or more and 1 hour or less.

By performing the polymerization reaction under the above-mentioned conditions, the forming time of the polyelectrolyte composition can be reduced as compared with a thermal polymerization reaction. Due to this, the production time for the lithium battery 300 can be reduced. The method for forming the electrolyte section 320 containing the polyelectrolyte 33 is not limited to the above-mentioned method, and a thermal polymerization reaction may be used, and a polymerization reaction by an energy ray and a thermal polymerization reaction may be used in combination.

The step S25 (formation of the negative electrode 30) and the step S26 (formation of the first current collector 41) correspond to the step S7 and the step S8, respectively, of the first embodiment, and therefore are performed in the same manner as in the first embodiment. By undergoing the above-mentioned steps, the lithium battery 300 is produced.

As described above, by the lithium battery 300 as the battery and the method for producing the lithium battery 300 according to the above-mentioned embodiment, the following effects can be obtained in addition to the effects of the first embodiment.

According to the above-mentioned embodiment, a polymerization reaction by an energy ray is used in the formation of the electrolyte section 320, and therefore, the formation can be performed in a shorter time than in the case where a thermal polymerization reaction or a method such as firing is used, and the production time for the lithium battery 300 can be reduced. Further, the electrolyte section 320 is formed so as to contain a (vinyl sulfonate-polyalkylene glycol (meth)acrylate) copolymer and a lithium salt compound, and therefore, the lithium battery 300 in which the lithium ion conduction property of the electrolyte section 320 is improved as compared with the related art can be produced.

Next, the effects of the above-mentioned embodiment will be more specifically described by showing Examples and Comparative Examples with respect to the electrolyte section 320 to be used in the lithium battery 300 according to the above-mentioned embodiment. FIGS. 12 and 13 are tables showing the compositions of polyelectrolytes according to Examples and Comparative Examples.
Production of Electrolyte Section for Evaluation

Example 6

An electrolyte section for evaluation of Example 6 was produced using the production method of the third embodiment described above. Here, a method for producing the electrolyte section for evaluation alone will be specifically described.

The polyelectrolyte 33 (electrolyte section for evaluation) of Example 6 contains the polyelectrolyte composition of the above formula (1) obtained by using PPGAc and vinyl sulfonic acid as the forming materials, Li-TFSI (lithium salt compound), and Irgacure 651 (radical photopolymerization initiator) as shown in FIG. 12.

The precursor solution 33X of the polyelectrolyte 33 of Example 6 was prepared in the same manner as in Example 1 except that AIBN (polymerization initiator) of Example 1 was changed to Irgacure 651 (polymerization initiator) (0.0062 g, 2.42×10$^{-5}$ mol). Incidentally, in the polyelectrolyte 33 (precursor solution 33X) of Example 6, in the above formula (1), when m and n are set as follows: m+n=10, m and n satisfy the following formula: m=n=5.

Subsequently, 20 µL of the precursor solution 33X was dropped approximately at the center in the long side direction of a slide glass (White Slide Glass S1112 Edge Grinding No. 2, Matsunami Glass Ind., Ltd.). Subsequently, a cover glass (NEO Cover Glass (25 mm×36 mm) No. 1, Matsunami Glass Ind., Ltd.) having a thickness of about 0.15 mm was placed as a spacer in the vicinity of each of the both ends in the long side direction of the slide glass one by one. Further, a slide glass (White Slide Glass S1112 Edge Grinding No. 2) was overlaid on the upper surface thereof, and a region in the vicinity of each of the both ends in the long side direction of the resulting material was held with a double clip. By doing this, the dropped precursor solution 33X was formed into a liquid film having a thickness of about 0.15 mm between the above-mentioned slide glasses.

Subsequently, by using a handy UV lamp (short wavelength 254 nm type) (AS ONE Co., Ltd.) having an emission peak wavelength of 254 nm as the UV irradiation device 93, the liquid film of the precursor solution 33X was irradiated with a UV ray for 30 minutes from a substantially vertical direction. By doing this, the polymerization reaction proceeds, whereby the precursor solution 33X is cured. Thereafter, a razor blade was inserted between the two slide glasses to separate the slide glasses, and a film formed by curing the precursor solution 33X was peeled off from the slide glasses. The film formed by curing the precursor solution 33X was used as the electrolyte section for evaluation of Example 6.

Example 7

The precursor solution 33X of the polyelectrolyte 33 of Example 7 was prepared in the same manner as in Example 2 except that AIBN (polymerization initiator) of Example 2 was changed to Irgacure 651 (polymerization initiator) (0.0044 g, 1.73×10$^{-5}$ mol). Incidentally, in the polyelectrolyte 33 (precursor solution 33X) of Example 7, in the above formula (1), when m and n are set as follows: m+n=10, m and n satisfy the following formulae: m=3 and n=7. Thereafter, the same procedure as in Example 6 was performed, whereby an electrolyte section for evaluation was produced.

Example 8

The precursor solution 33X of the polyelectrolyte 33 of Example 8 was prepared in the same manner as in Example 3 except that AIBN (polymerization initiator) of Example 3 was changed to Irgacure 651 (polymerization initiator) (0.0039 g, 1.51×10$^{-5}$ mol). Incidentally, in the polyelectrolyte 33 (precursor solution 33X) of Example 8, in the above formula (1), when m and n are set as follows: m+n=10, m and n satisfy the following formulae: m=2 and n=8. Thereafter, the same procedure as in Example 6 was performed, whereby an electrolyte section for evaluation was produced.

Example 9

The precursor solution 33X of the polyelectrolyte 33 of Example 9 was prepared in the same manner as in Example 4 except that AIBN (polymerization initiator) of Example 4 was changed to Irgacure 651 (polymerization initiator) (0.0034 g, 1.34×10$^{-5}$ mol). Incidentally, in the polyelectrolyte 33 (precursor solution 33X) of Example 9, in the above formula (1), when m and n are set as follows: m+n=10, m and n satisfy the following formulae: m=1 and n=9. Thereafter, the same procedure as in Example 6 was performed, whereby an electrolyte section for evaluation was produced.

Example 10

The polyelectrolyte 33 (electrolyte section for evaluation) of Example 10 contains the polyelectrolyte composition of the above formula (1) obtained by using PEGMAc and vinyl sulfonic acid as the forming materials, Li-TFSI (lithium salt compound), and Irgacure 651 (radical photopolymerization initiator) as shown in FIG. 13.

The precursor solution 33X of the polyelectrolyte 33 of Example 10 was prepared in the same manner as in Example 6 except that PPGAc (polyalkylene glycol (meth)acrylate) of Example 6 was changed to PEGMAc (polyalkylene glycol (meth)acrylate) (1.0512 g, 2.92×10$^{-3}$ mol). Incidentally, in the polyelectrolyte 33 (precursor solution 33X) of Example 10, in the above formula (1), when m and n are set as follows: m+n=10, m and n satisfy the following formula: m=n=5.

Subsequently, in the same manner as in Example 6, the precursor solution 33X was irradiated with a UV ray using the UV irradiation device 93. Thereafter, the double clips holding the two slide glasses were detached, and the slide glasses were placed on a hot plate pre-heated to 50° C. After a heating treatment was performed for 1 minute in this state, the slide glasses were picked up. That is, in Example 10, the electrolyte section for evaluation was formed by performing UV irradiation and a heating treatment in combination. Thereafter, a film of the cured precursor solution 33X was peeled off in the same manner as in Example 6. This film was used as the electrolyte section for evaluation of Example 10.

Example 11

The precursor solution 33X of the polyelectrolyte 33 of Example 11 was prepared in the same manner as in Example 7 except that PPGAc of Example 7 was changed to PEGMAc (1.0512 g, 2.92×10$^{-3}$ mol). Incidentally, in the polyelectrolyte 33 (precursor solution 33X) of Example 11, in the above formula (1), when m and n are set as follows: m+n=10, m and n satisfy the following formulae: m=3 and n=7. Thereafter, the same procedure as in Example 10 was performed, whereby an electrolyte section for evaluation was produced.

Example 12

The precursor solution 33X of the polyelectrolyte 33 of Example 12 was prepared in the same manner as in Example 8 except that PPGAc of Example 8 was changed to PEGMAc (1.0512 g, 2.92×10$^{-3}$ mol). Incidentally, in the polyelectrolyte 33 (precursor solution 33X) of Example 12, in the above formula (1), when m and n are set as follows: m+n=10, m and n satisfy the following formulae: m=2 and n=8. Thereafter, the same procedure as in Example 10 was performed, whereby an electrolyte section for evaluation was produced.

Example 13

The precursor solution 33X of the polyelectrolyte 33 of Example 13 was prepared in the same manner as in Example 9 except that PPGAc of Example 9 was changed to PEGMAc (1.0512 g, 2.92×10$^{-3}$ mol). Incidentally, in the polyelectrolyte 33 (precursor solution 33X) of Example 13, in the above formula (1), when m and n are set as follows: m+n=10, m and n satisfy the following formulae: m=1 and n=9. Thereafter, the same procedure as in Example 10 was performed, whereby an electrolyte section for evaluation was produced.

Comparative Example 3

A precursor solution of a polyelectrolyte of Comparative Example 3 was prepared in the same manner as in Comparative Example 1 except that AIBN (polymerization initiator) of Comparative Example 1 was changed to Irgacure 651 (polymerization initiator) (0.0031 g, 1.21×10$^{-5}$ mol) as shown in FIG. 12. Incidentally, in Comparative Example 3, vinyl sulfonic acid is not used, and therefore, in the above formula (1), when m and n are set as follows: m+n=10, m and n satisfy the following formulae: m=0 and n=10, and m does not satisfy the following formula: 1≤m≤5. Thereafter, the same procedure as in Example 6 was performed, whereby an electrolyte section for evaluation was produced.

Comparative Example 4

With respect to a precursor solution of a polyelectrolyte of Comparative Example 4, the same procedure as in Comparative Example 2 was performed except that AIBN (polymerization initiator) of Comparative Example 2 was changed to Irgacure 651 (polymerization initiator) (0.0069 g, 2.69×10$^{-5}$ mol), however, Li-TFSI was not dissolved in PPGAc, and a precursor solution could not be prepared. In the composition of the precursor solution of Comparative Example 4, in the above formula (1), when m and n are set as follows: m+n=10, m and n satisfy the following formulae: m=5.5 and n=4.5, and do not satisfy the following formulae: 1≤m≤5 and 5≤n≤9.

Comparative Example 5

A precursor solution of a polyelectrolyte of Comparative Example 5 was prepared in the same manner as in Comparative Example 3 except that PPGAc of Comparative Example 3 was changed to PEGMAc (1.0512 g, 2.92×10$^{-3}$ mol) as shown in FIG. 13. Incidentally, in the polyelectrolyte (precursor solution) of Comparative Example 5, in the above formula (1), when m and n are set as follows: m+n=10, m and n satisfy the following formulae: m=0 and n=10, and m does not satisfy the following formula: 1≤m≤5. Thereafter, the same procedure as in Example 10 was performed, whereby an electrolyte section for evaluation was produced.

Comparative Example 6

With respect to a precursor solution of a polyelectrolyte of Comparative Example 6, the same procedure as in Comparative Example 4 was performed except that PPGAc of Comparative Example 4 was changed to PEGMAc (1.0512 g, 2.92×10$^{-3}$ mol), however, Li-TFSI was not dissolved in PEGMAc, and a precursor solution could not be prepared. In the composition of the precursor solution of Comparative Example 6, in the above formula (1), when m and n are set as follows: m+n=10, m and n satisfy the following formulae: m=5.5 and n=4.5, and do not satisfy the following formulae: 1≤m≤5 and 5≤n≤9.

Evaluation Methods and Evaluation Results

Figure 14:
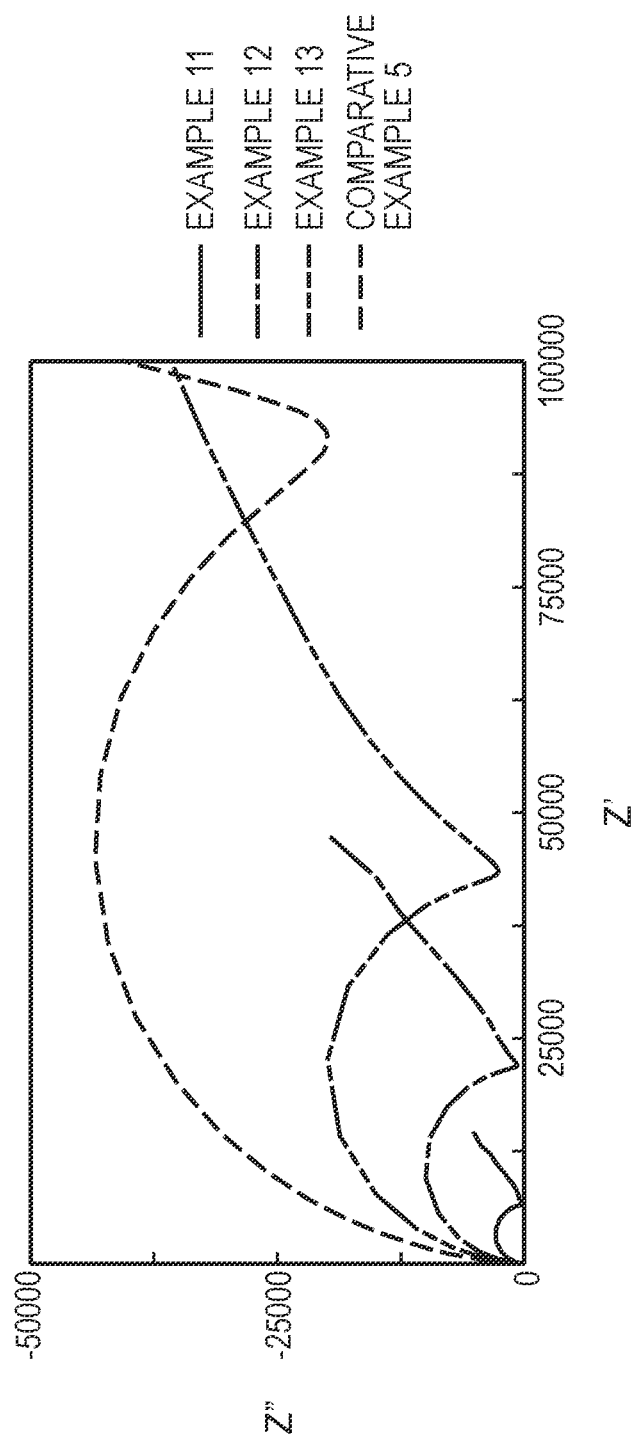
FIG. 14 is a graph showing examples of Cole-Cole plots of the impedance spectra of Examples and Comparative Examples.

With respect to the electrolyte sections for evaluation of Examples and Comparative Examples, evaluation was performed by the following method, and the results are shown in FIGS. 14 and 15. FIG. 14 is a graph showing examples of Cole-Cole plots of the impedance spectra of Examples and Comparative Examples. FIG. 15 is a table showing the evaluation results of the lithium ion conduction property according to Examples and Comparative Examples.

Lithium Ion Conduction Property

Each electrolyte section for evaluation was cut out in the shape of a disk having a diameter of 10 mm. A lithium foil having a diameter of 7 mm and a thickness of 50 μm was pressed against both front and back surfaces of the disk to form an electrode, and further, a copper foil having a diameter of 7 mm and a thickness of 30 μm was pressed against both surfaces of the electrode to form a sample for measurement. Subsequently, by using an impedance analyzer SI 1260 (Solartron, Inc.), the AC impedance of the sample for measurement was measured at an AC voltage amplitude of 10 mV and a measurement frequency ranging from $10^7$ Hz to $10^{-2}$ Hz. Among the Cole-Cole plots of the obtained impedance spectra, those of Examples 11 to 13 and Comparative Example 5 are shown in FIG. 14. In FIG. 14, the horizontal axis represents the real component of the wavenumber (Z') of the impedance, and the vertical axis represents the imaginary component of the wavenumber (Z") of the impedance. From these Cole-Cole plots, the total ion conductivity was calculated as the index of the lithium ion conduction property. The total ion conductivity of each of the electrolyte sections for evaluation of Examples and Comparative Examples are shown in FIG. 15. Further, the total ion conductivity was evaluated according to the following criteria which are the same as in Example 1. The results are shown in FIG. 15.

A: The total ion conductivity is $7.0 \times 10^{-6}$ or more.

B: The total ion conductivity is $2.0 \times 10^{-6}$ or more and less than $7.0 \times 10^{-6}$.

C: The total ion conductivity is $7.0 \times 10^{-7}$ or more and less than $2.0 \times 10^{-6}$.

D: The total ion conductivity is less than $7.0 \times 10^{-7}$.

As shown in FIG. 14, it is found that the internal resistance is decreased in Examples as compared with that in Comparative Example 5. Further, as shown in FIG. 15, Examples 6 to 13 were evaluated as A which corresponds to "very suitable" or B which corresponds to "suitable". According to this, it was shown that Examples 6 to 13 have an excellent lithium ion conduction property.

On the other hand, Comparative Examples 3 and 5 were evaluated as C which corresponds to "not suitable", and therefore, it was found that Comparative Examples 3 and 5 have a lower lithium ion conduction property than Examples. Further, it was found that in Comparative Examples 4 and 6, a lithium battery could not be produced.

Fourth Embodiment

Electronic Apparatus

Figure 16:
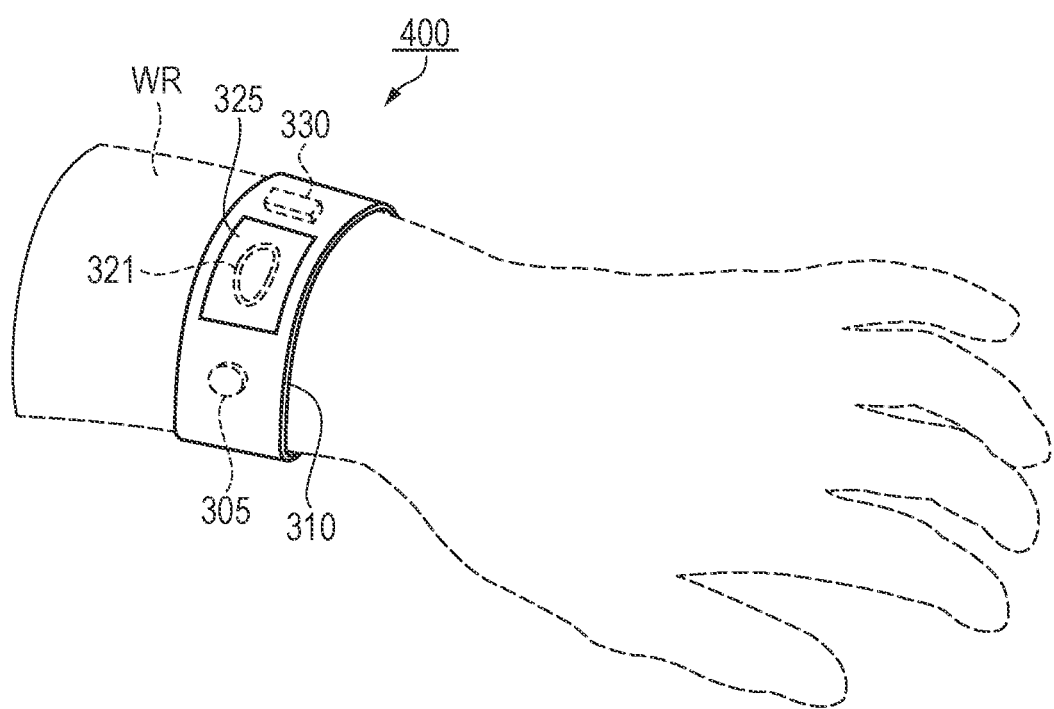
FIG. 16 is a schematic view showing a configuration of a wearable apparatus as an electronic apparatus according to a fourth embodiment.

An electronic apparatus according to this embodiment will be described with reference to FIG. 16. In this embodiment, the electronic apparatus will be described by showing a wearable apparatus as an example. FIG. 16 is a schematic view showing a configuration of a wearable apparatus as the electronic apparatus according to the fourth embodiment.

As shown in FIG. 16, a wearable apparatus 400 of this embodiment is worn on, for example, the wrist WR of the human body using a band 310 like a watch, and is an information apparatus for obtaining information related to the human body. The wearable apparatus 400 includes a battery 305, a display section 325, a sensor 321, and a processing section 330. As the battery 305, the lithium battery according to the above-mentioned embodiment is included.

The band 310 is formed into a belt shape using a resin having flexibility such as rubber so as to come into close contact with the wrist WR when it is worn. In an end portion of the band 310, a binding section (not shown) capable of adjusting the binding position according to the thickness of the wrist WR is provided.

The sensor 321 is disposed on the inner surface side (the wrist WR side) of the band 310 so as to come into contact with the wrist WR when it is worn. The sensor 321 obtains information related to the pulse rate, the blood glucose level, or the like of the human body when it comes into contact with the wrist WR, and outputs the information to the processing section 330. As the sensor 321, for example, an optical sensor is used.

The processing section 330 is incorporated in the band 310, and is electrically connected to the sensor 321 and the display section 325. As the processing section 330, for example, an integrated circuit (IC) is used. The processing section 330 performs arithmetic processing of the pulse rate, the blood glucose level, or the like based on the output from the sensor 321, and outputs display data to the display section 325.

The display section 325 displays the display data such as the pulse rate or the blood glucose level output from the processing section 330. As the display section 325, for example, a light-receiving type liquid crystal display device is used. The display section 325 is disposed on the outer surface side (a side opposite to the inner surface on which the sensor 321 is disposed) of the band 310 so that a wearer can read the display data when the wearer wears the wearable apparatus 400.

The battery 305 functions as a power supply source which supplies power to the display section 325, the sensory 321, and the processing section 330. The battery 305 is incorporated in the band 310 in an attachable and detachable manner.

According to the above configuration, the wearable apparatus 400 can obtain information related to the pulse rate or the blood glucose level of a wearer from the wrist WR and can display it as information such as the pulse rate or the blood glucose level through arithmetic processing or the like. Further, to the wearable apparatus 400, the lithium battery according to the above-mentioned embodiment having an improved ion conduction property and a large battery capacity in spite of having a small size is applied, and therefore, the weight can be reduced, and also the operating time can be increased. Moreover, since the lithium battery according to the above-mentioned embodiment is an all-solid-state secondary battery, the battery can be repetitively used by charging, and also there is no concern about leakage of the electrolytic solution or the like, and therefore, the wearable apparatus 400 which can be used safely for a long period of time can be provided.

In this embodiment, a watch-type wearable apparatus is illustrated as the wearable apparatus 400, however, the invention is not limited thereto. The wearable apparatus may be a wearable apparatus to be worn on, for example, the ankle, the head, the ear, the waist, or the like.

The electronic apparatus to which the battery 305 (the lithium battery according to the above-mentioned embodiment) is applied as the power supply source is not limited to the wearable apparatus 400. As other electronic apparatuses, for example, a display to be worn on the head such as a head-mounted display, a head-up display, a portable telephone, a portable information terminal, a notebook personal computer, a digital camera, a video camera, a music player, a wireless headphone, a portable gaming machine, and the like can be exemplified. These electronic apparatuses may have another function, for example, a data communication function, a gaming function, a recording and playback function, a dictionary function, or the like.

Further, the electronic apparatus of this embodiment is not limited to the use for general consumers, and can also be applied to industrial use. Moreover, the apparatus to which the lithium battery according to the above-mentioned embodiment is applied is not limited to electronic apparatuses. For example, the lithium battery according to the above-mentioned embodiment may be applied as a power supply source for a moving object. Specific examples of the moving object include automobiles, motorcycles, forklifts, and flying objects such as unmanned planes. According to this, a moving object including a battery having an improved ion conduction property as a power supply source can be provided.

The invention is not limited to the above-mentioned embodiments and various changes, modifications, etc. can be added to the above-mentioned embodiments.

The entire disclosure of Japanese Patent Application No. 2016-230930, filed Nov. 29, 2016 is expressly incorporated by reference herein.

What is claimed is:

1. A polyelectrolyte composition represented by the following formula (1):

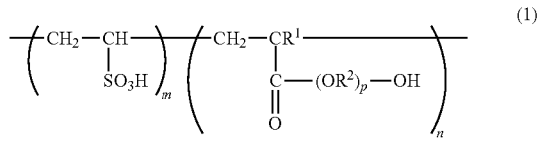

(wherein $R^1$ is hydrogen or $CH_3$, $R^2$ is any of $C_2H_4$, $CH(CH_3)CH_2$, and $(CH_2)_3$, m and n are each a copolymerization ratio of a structural unit in parentheses, and when m and n are set as follows: m+n=10, m and n satisfy the following formulae: $1 \leq m \leq 5$ and $5 \leq n \leq 9$, and p is 2 or more and 8 or less).

2. The polyelectrolyte composition according to claim 1, wherein in the formula (1), when m and n are set as follows: m+n=10, m and n satisfy the following formulae: $2.5 \leq m \leq 5$ and $5 \leq n \leq 8.5$.

3. A polyelectrolyte comprising the polyelectrolyte composition according to claim 1 and a lithium salt compound.

4. A polyelectrolyte comprising the polyelectrolyte composition according to claim 2 and a lithium salt compound.

5. A battery comprising:
an electrolyte section containing the polyelectrolyte according to claim 3;
an assembly provided in contact with the electrolyte section and containing an active material and an electrolyte; and
a current collector provided for the electrolyte section through the assembly.

6. The battery according to claim 5, wherein in the formula (1), when m and n are set as follows: m+n=10, m and n satisfy the following formulae: $2.5 \leq m \leq 5$ and $5 \leq n \leq 8.5$.

7. An electronic apparatus comprising the battery according to claim 5.

8. An electronic apparatus comprising the battery according to claim 6.

* * * * *